Aug. 15, 1939.　　M. E. LANGE ET AL　　2,169,766
MACHINE TOOL
Filed Dec. 11, 1935　　9 Sheets-Sheet 1
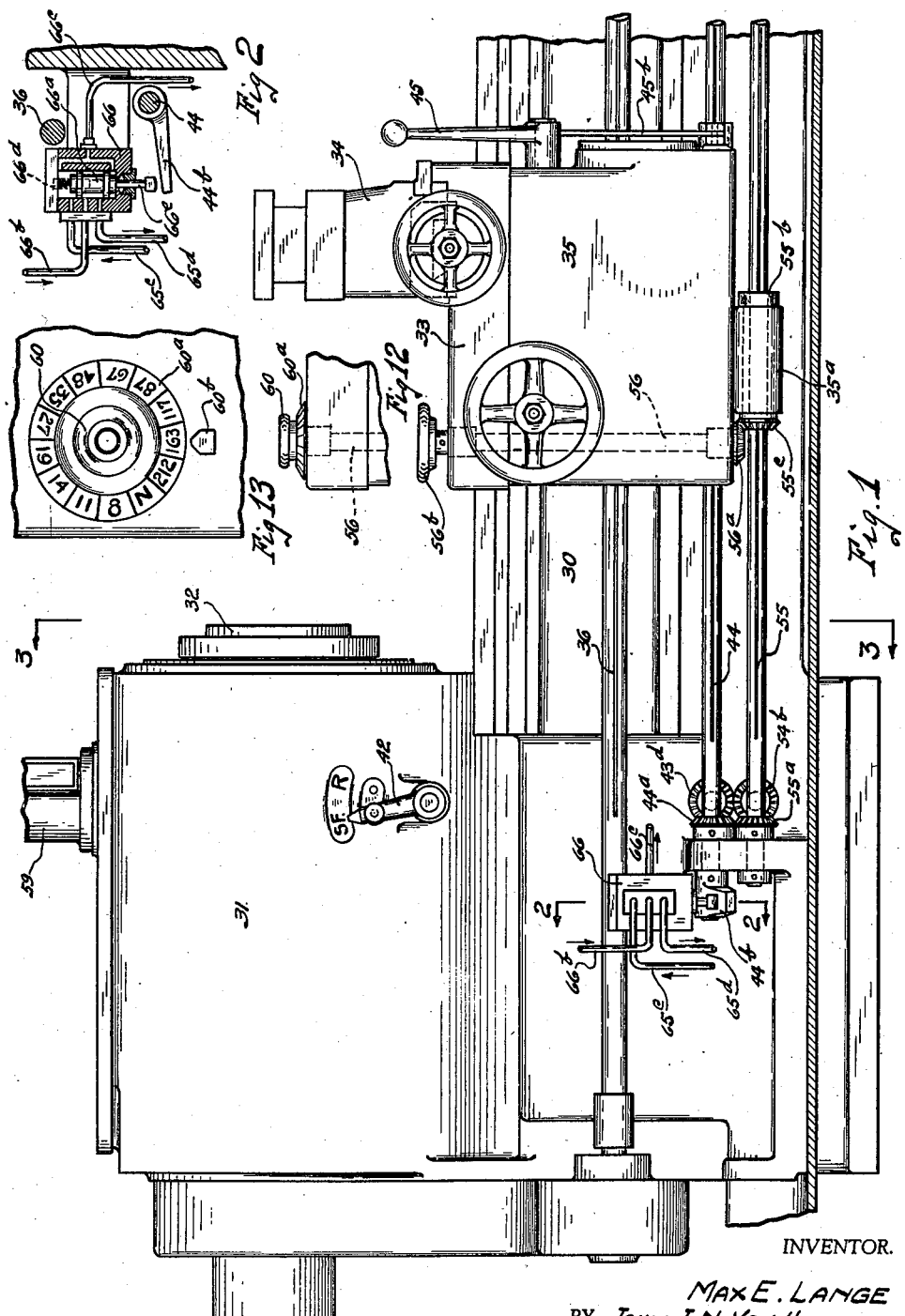
INVENTOR.
Max E. Lange
BY John J. N. Van Hamersveld
Kwis, Hudson & Kent
ATTORNEYS Aug. 15, 1939.　　　M. E. LANGE ET AL　　　2,169,766
MACHINE TOOL
Filed Dec. 11, 1935　　　9 Sheets-Sheet 2
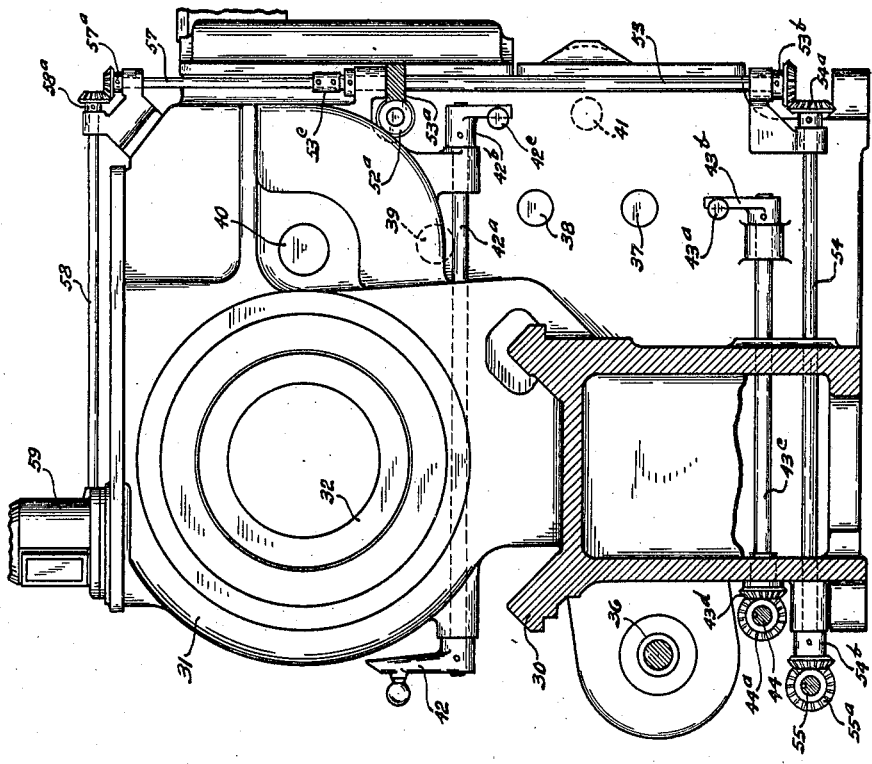
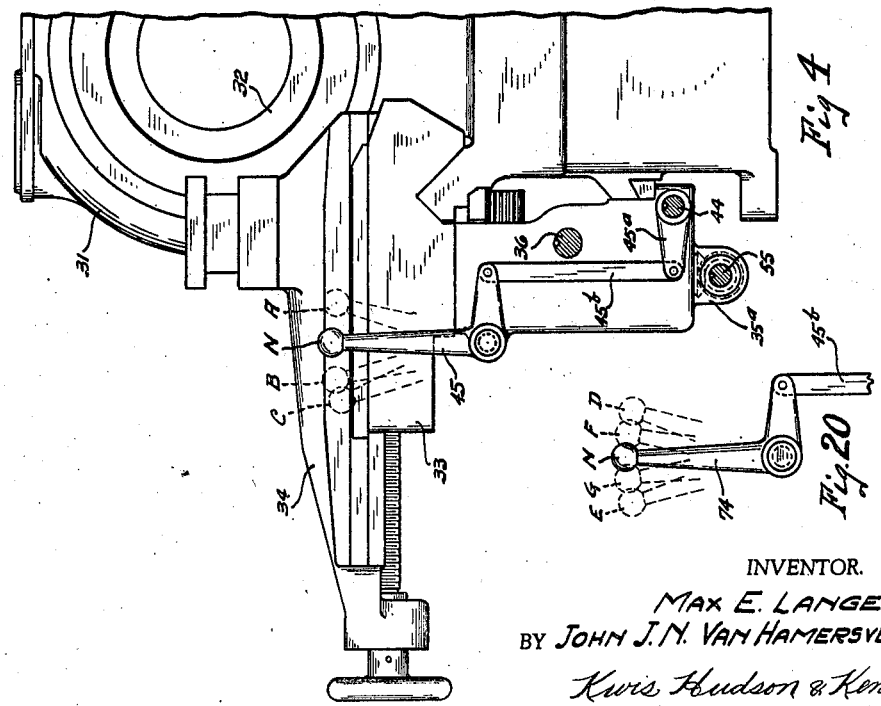
INVENTOR.
MAX E. LANGE
BY JOHN J. N. VAN HAMERSVELD
Kwis Hudson & Kent
ATTORNEYS

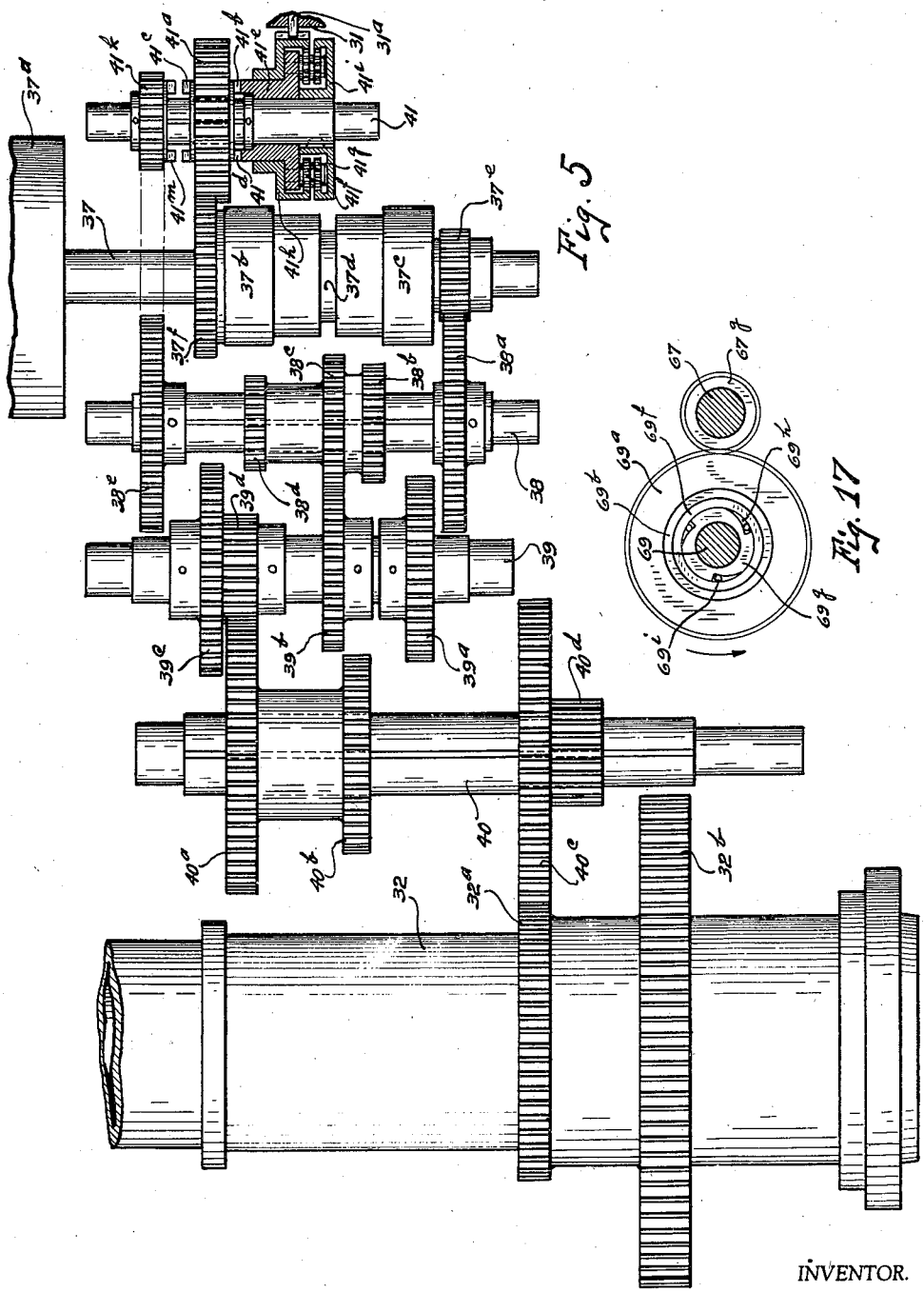

Aug. 15, 1939.   M. E. LANGE ET AL   2,169,766
MACHINE TOOL
Filed Dec. 11, 1935   9 Sheets-Sheet 4
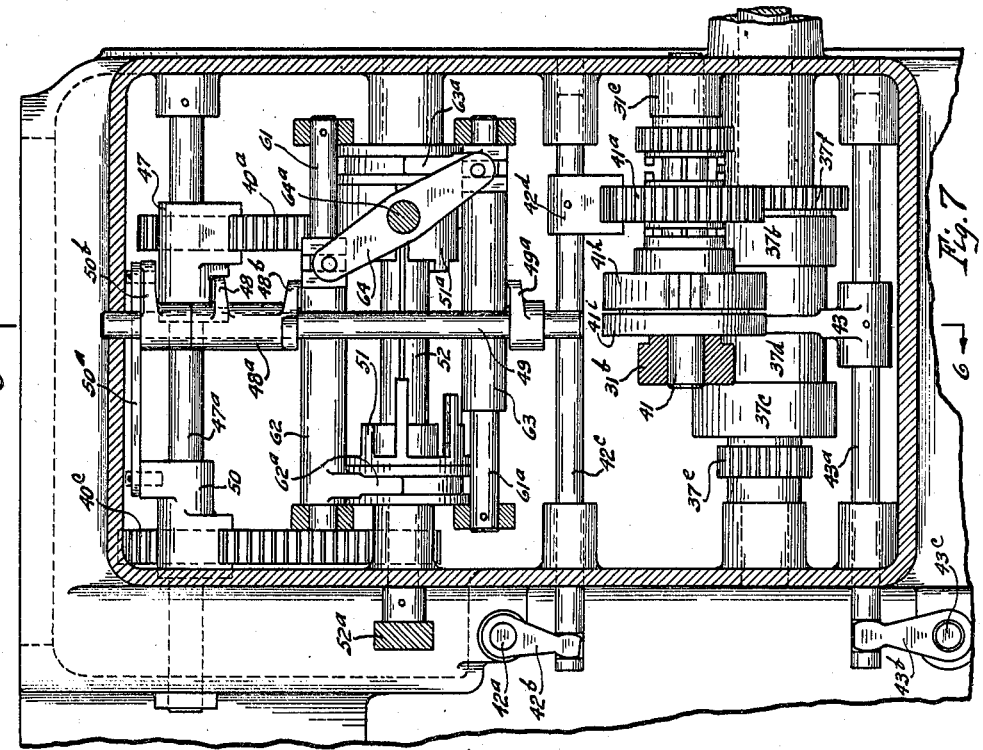
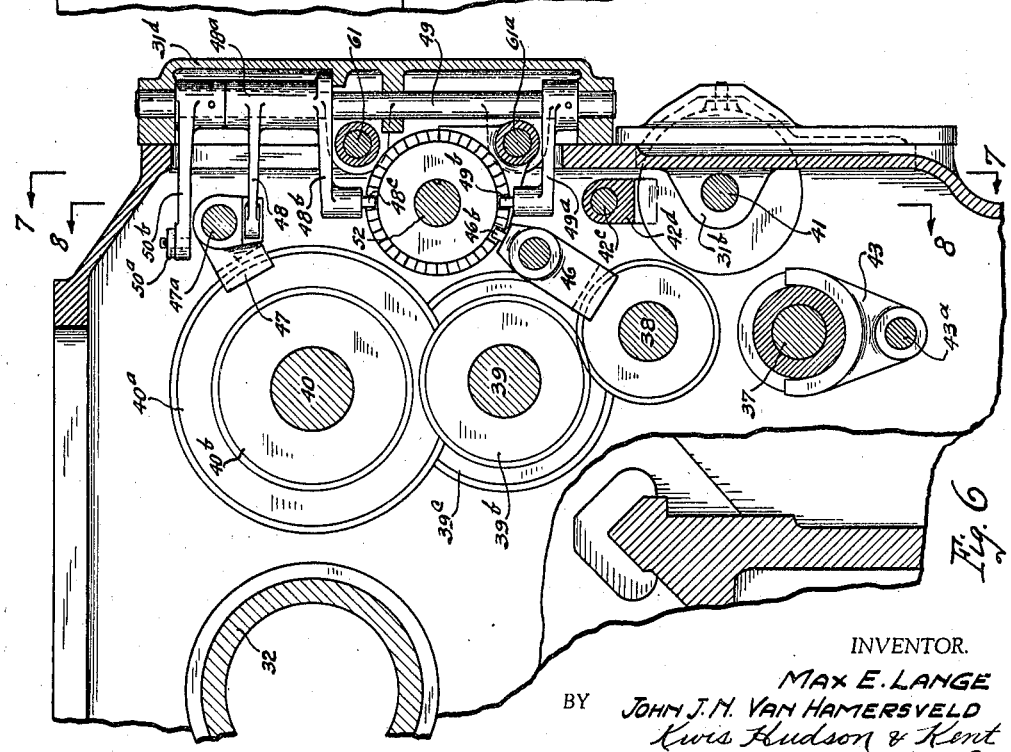
INVENTOR.
MAX E. LANGE
JOHN J. H. VAN HAMERSVELD
BY Lewis Hudson & Kent
ATTORNEYS Aug. 15, 1939.　　　M. E. LANGE ET AL　　　2,169,766
MACHINE TOOL
Filed Dec. 11, 1935　　　9 Sheets-Sheet 5
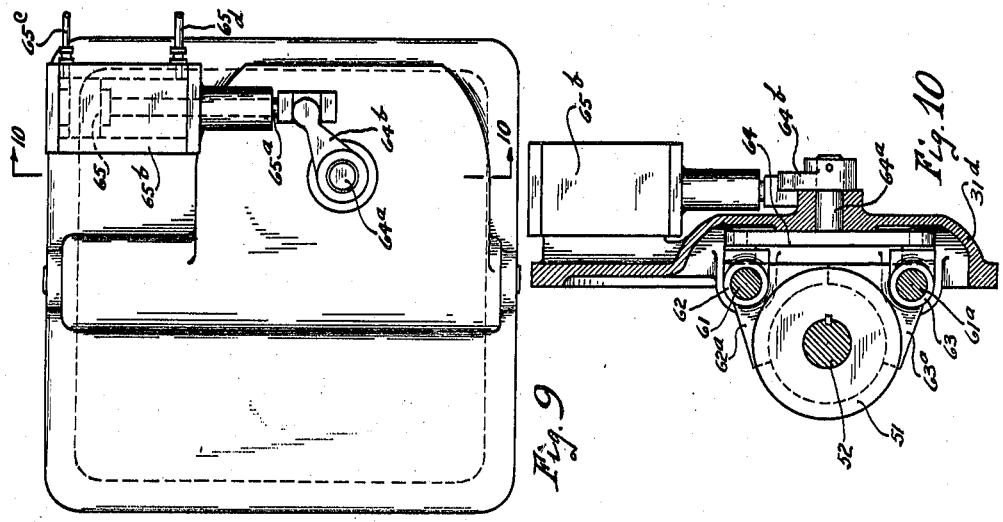
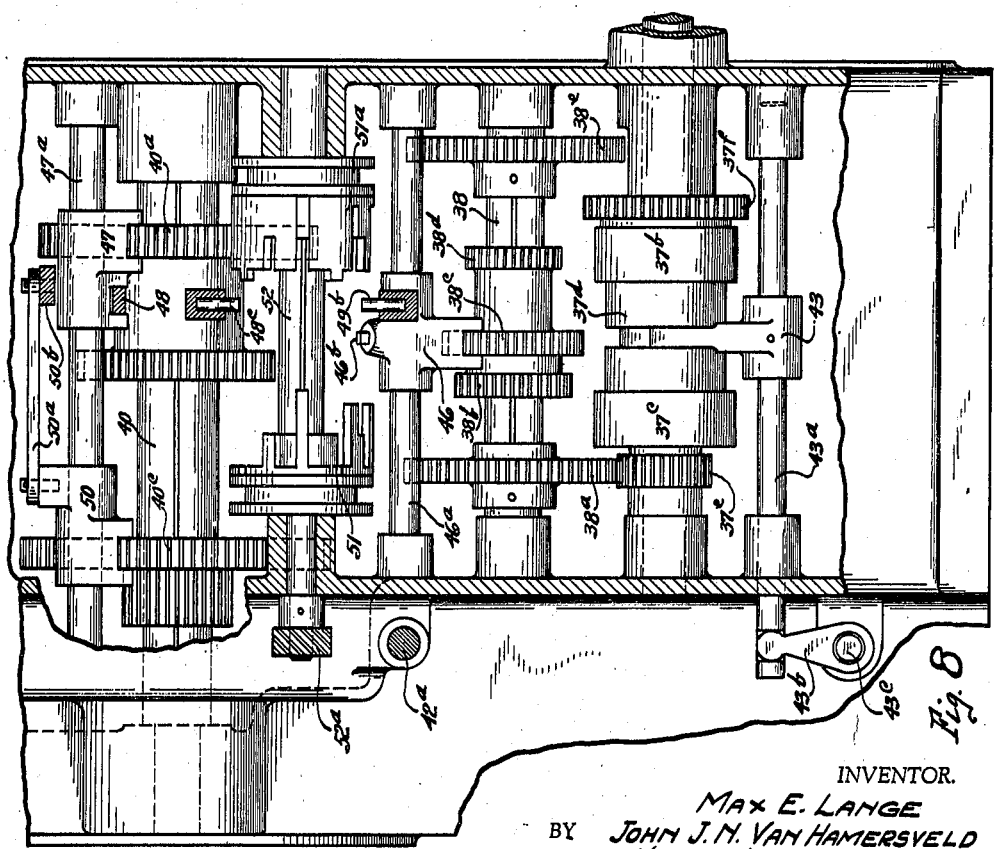
INVENTOR.
Max E. Lange
BY John J. N. Van Hamersveld
Kwis Hudson & Kent
ATTORNEYS

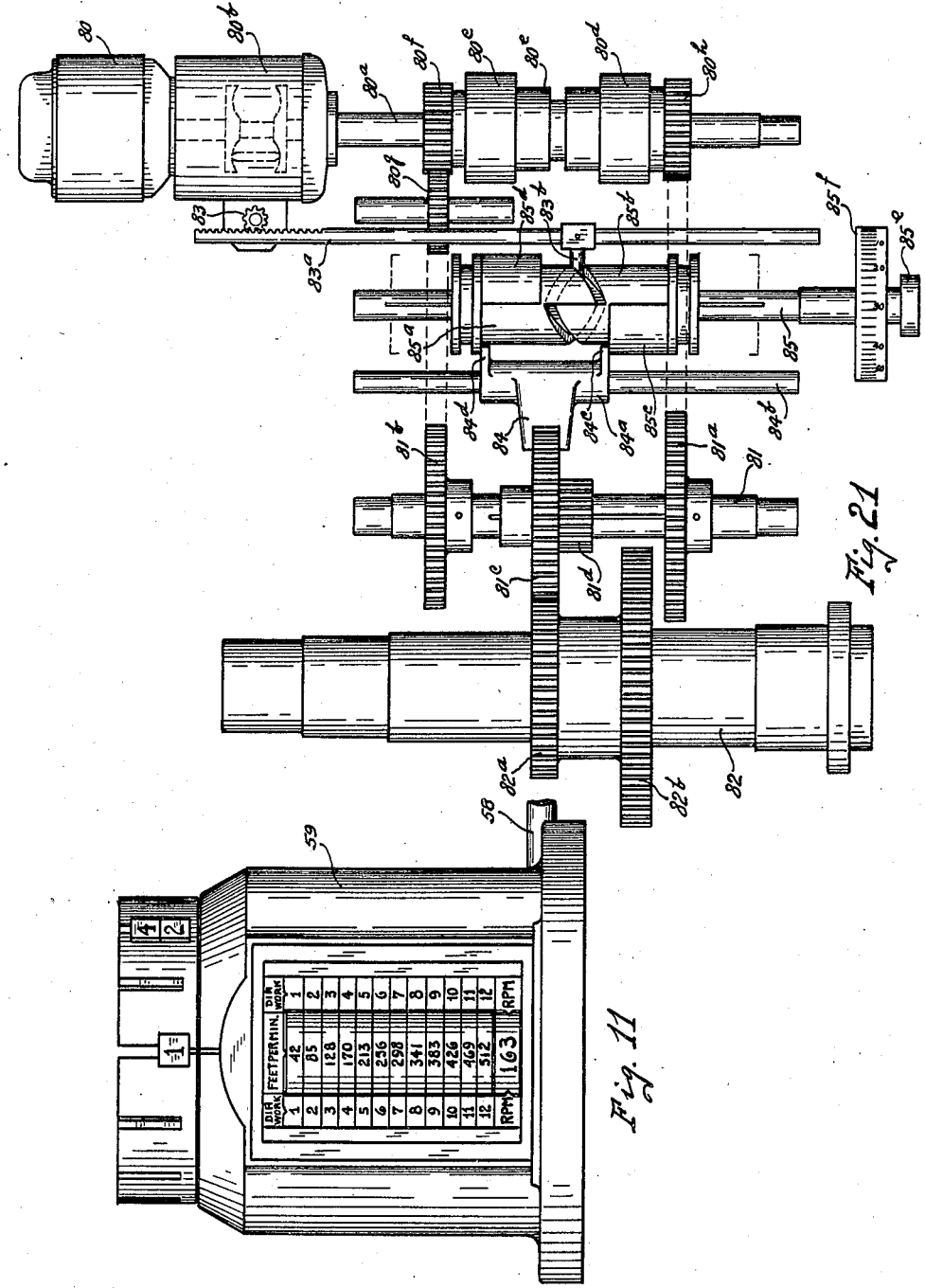

Aug. 15, 1939.   M. E. LANGE ET AL   2,169,766
MACHINE TOOL
Filed Dec. 11, 1935   9 Sheets-Sheet 7
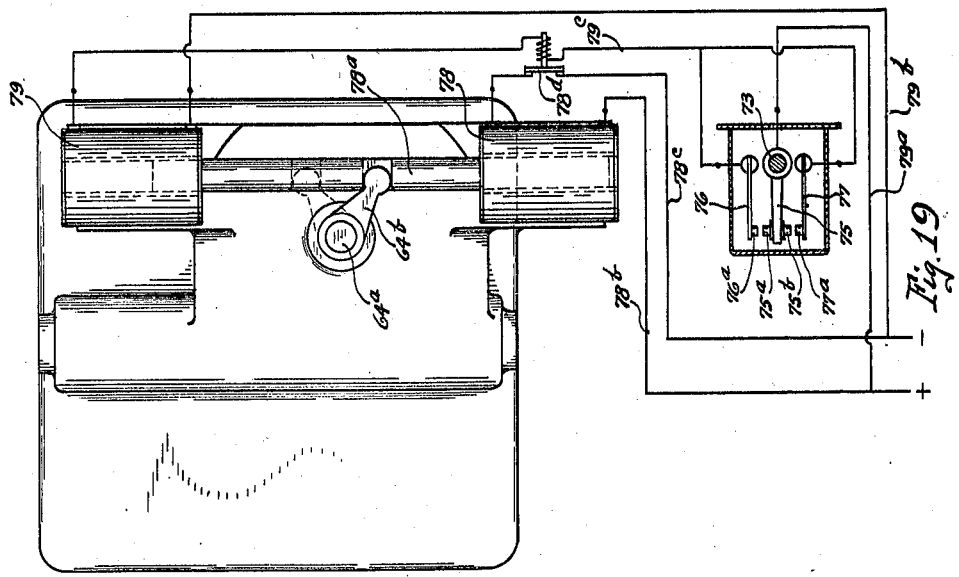
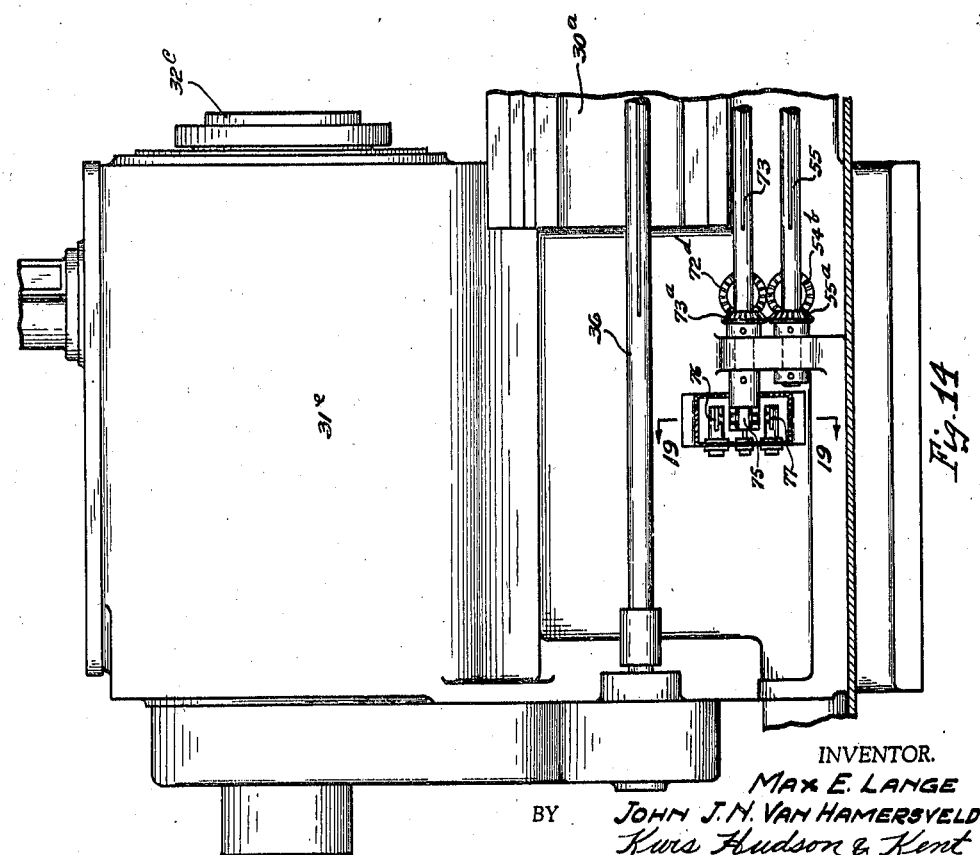
INVENTOR.
Max E. Lange
John J. N. Van Hamersveld
BY Kwis Hudson & Kent
ATTORNEYS

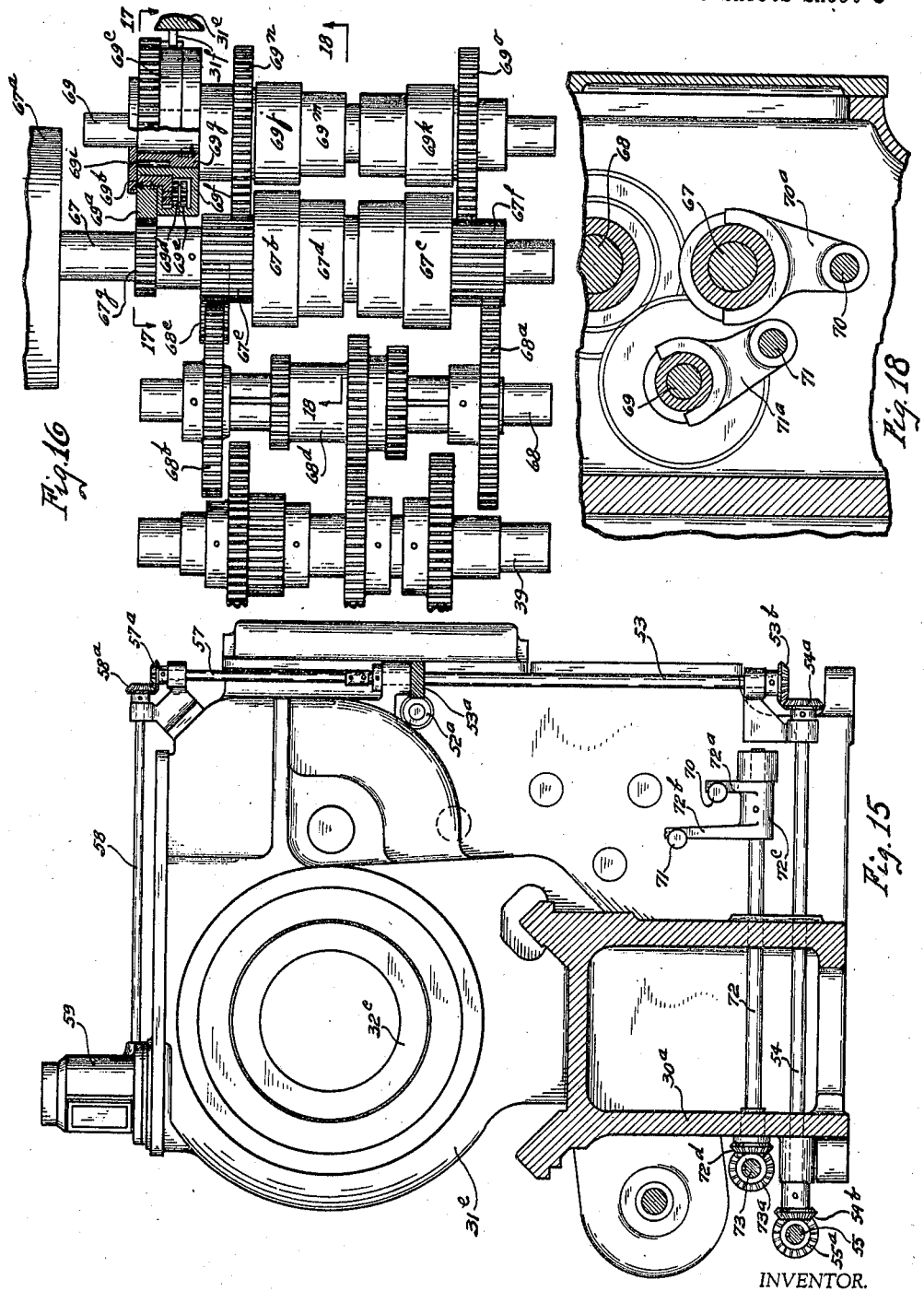

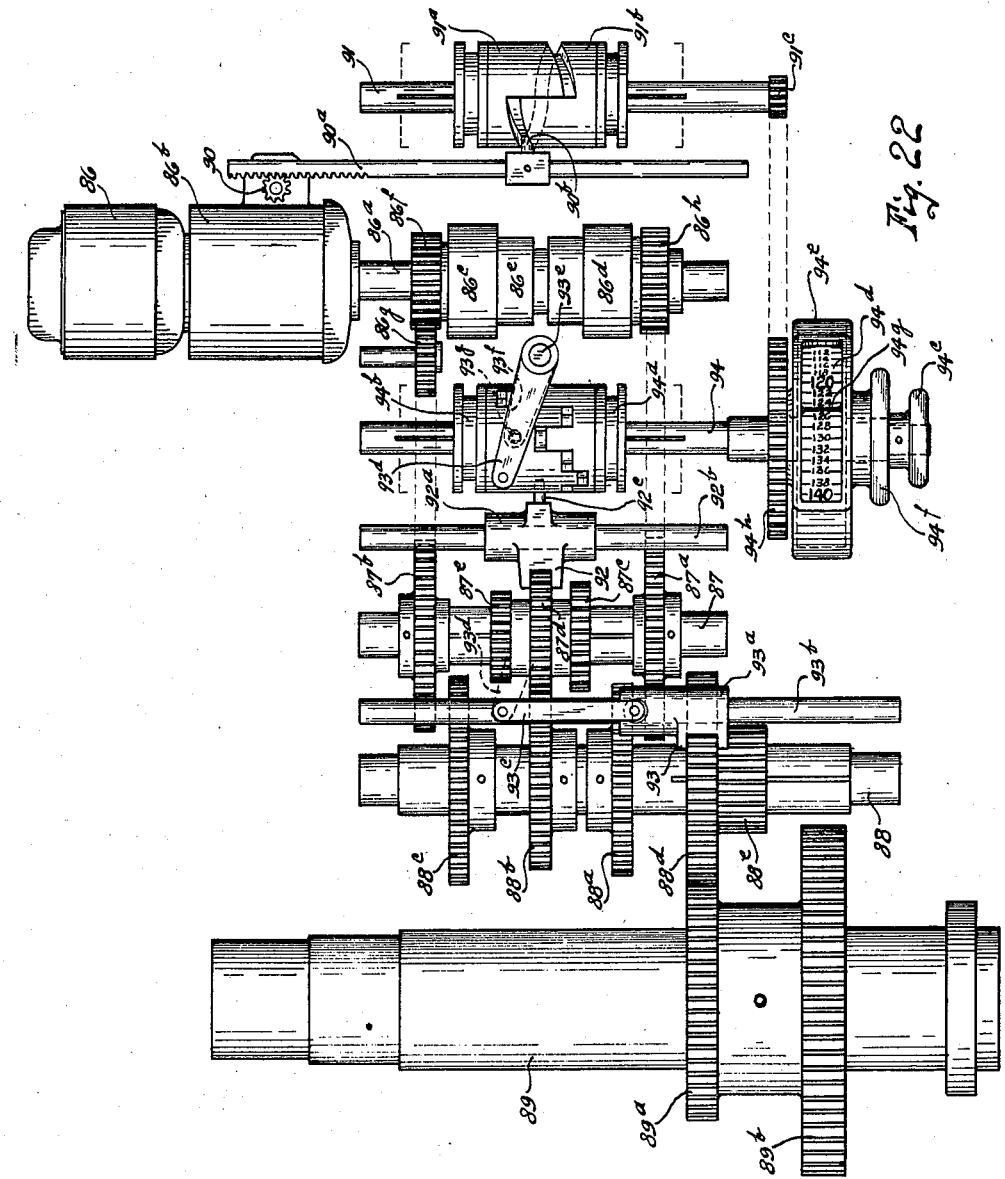

Patented Aug. 15, 1939

2,169,766

UNITED STATES PATENT OFFICE 2,169,766

MACHINE TOOL

Max E. Lange and John J. N. Van Hamersveld, Cleveland Heights, Ohio, assignors to The Warner & Swasey Company, Cleveland, Ohio, a corporation of Ohio Application December 11, 1935, Serial No. 53,938

62 Claims. (Cl. 82—29)

This invention relates to a machine tool and although it may be applied to other types of machine tools it will be described herein by way of illustration as applied to a lathe.

An object of the invention is to provide in a machine tool having a part to be moved at different rates and change speed gearing for changing the rate of movement of said part, means for facilitating the shifting of said change speed gearing to vary the rate of said part.

Another object of the invention is to provide in association with the change speed gearing forming the drive for a movable part of a machine tool means whereby when said gearing is shifted it can be readily intermeshed without clashing.

Another object is to provide in a machine tool having a movable part and change speed gearing for changing the rate of movement of said part, means for effecting a slow power driven movement of said part and said change speed gearing preparatory to the shifting of said change speed gearing to change the speed of said part.

Another object is to provide in a machine tool having a movable part, change speed gearing for moving said part at different rates, and means for starting, stopping or reversing the movement of said part, and including a movable control member, means for effecting a slow power driven movement for said change speed gearing and said part preparatory to shifting said gearing and effective during both forward and reverse movements of said part to eliminate gear clashing during shifting of the gears.

Another object is to provide in a machine tool having a movable part, change speed gearing for moving said part and means for preselecting during one operative step the rate of movement for said part during the next operative step of a work cycle, means for effecting a slow power driven movement of said gearing and part preparatory to and during the shifting of the gearing and controlled by the same means which actuates the shifting of the gearing after actuation of the preselecting means.

Another object is to provide in a machine tool having a movable part, change speed gearing for moving said part, means for preselecting during one operative step the rate of movement of said part in the next operative step of a work cycle and including means for shifting said gearing to obtain the preselected speed, and a control therefor, means for effecting a slow power driven movement of said gearing and parts preparatory to the shifting of the gearing and controlled by said control member.

Another object is to provide in a machine tool having a movable part, change speed gearing for varying the rate of movement of said part, and a control lever movable in one plane only for shifting said change speed gearing, means for effecting a slow power driven movement of said gearing and said part preparatory to the shifting of the former and controlled by said lever.

Another object is to provide in a machine tool having a part movable at varying rates and means for preselecting during one operative step the rate of movement of said part during the next operative step of a work cycle and including an indicating device, means remotely located with respect to said part for controlling said preselecting means and for operating said indicating device.

Another object is to provide in a machine tool having a movable part, means for preselecting during one operative step the rate of movement of said part during the following operative step of a work cycle and for effecting a change to the preselected rate of movement, said means including an indicating device, means for controlling said means to preselect and effect the change to the preselected rate of movement of said part and to actuate said indicating device and remotely located with respect to said part.

A further object is to provide in a machine tool including a head provided with a spindle, a slide, means for preselecting during one operative step the spindle speed for the next operative step of a work cycle, means for effecting the change to the preselected spindle speed, an indicating device located on the slide and operatively associated with said preselecting means, and a control member for operating the means for effecting the preselected speed and carried by said slide.

A further object is to provide in a machine tool having a movable part, speed change gearing for varying the rate of movement of said part, and a gradually accelerated or decelerated drive for said change speed gearing, such as a variable friction drive, a variable speed hydraulic motor, a variable speed electric motor or other suitable and similar devices of this character, together with mechanism for preselecting during one operative step the rate of movement of said part during the next operative step and operatively connected to said change speed gearing and said variable drive therefor.

Another object is to provide in a machine tool having a movable part, means for varying the rate of movement of said part in gradual and small increments of acceleration or deceleration, together with means for preselecting during one operative step the rate of movement of said part for the next operative step in the work cycle.

Another object is to provide in a machine tool having a movable part, means for moving said part at an infinite number of different rates of movement between maximum and minimum limits to thus provide a large degree of flexibility in the rates of movement imparted to said part, together with means for preselecting during one operative step the rate of movement of said part for the following operative step in the work cycle.

Another object is to provide in a machine tool having a movable part, means for varying the rate of movement of said part and including change speed gearing and an infinitely variable speed changing device, together with separate means for preselecting during one operative step the speed obtainable through said change speed gearing combined with the speed obtainable through said infinitely variable speed drive for the next operative step, and an indicating device operatively associated with both of said preselecting means and capable of indicating the rate of movement preselected for said part and resulting from the combined drives.

Another object is to provide in a machine tool having a movable part, change speed gearing for moving said part at different relatively widely separated rates of movements, an ifinitely variable speed changing device for varying the rate of movement of said part to include rates intermediate the rates obtained through said change speed gearing, separate means operatively connected with said change speed gearing and said variable speed device for preselecting during one operative step the rate of movement of said part for the next operative step, and an indicator operatively associated with said separate means and indicating the rate of movement preselected for said part.

Further and additional objects and advantages not hereinbefore referred to will become apparent hereinafter during the detailed description which is to follow of several embodiments of the invention.

Referring to the accompanying drawings,

Fig. 1 is a fragmentary front elevational view of a machine tool, such as a lathe, embodying one form of the invention.

Fig. 2 is a detached fragmentary sectional view taken substantially on line 2—2 of Fig. 1 looking in the direction of the arrows.

Fig. 3 is a sectional view taken substantially on line 3—3 of Fig. 1 looking in the direction of the arrows.

Fig. 4 is a fragmentary end elevational view of the machine shown in Fig. 1 and is taken looking from the right hand side of said Figure 1.

Fig. 5 is a developed diagrammatic view of the spindle and change speed gearing therefor in the head of the machine tool shown in Fig. 1.

Fig. 6 is a fragmentary sectional view taken substantially on line 6—6 of Fig. 7 looking in the direction of the arrows.

Fig. 7 is a sectional view taken substantially on line 7—7 of Fig. 6 looking in the direction of the arrows.

Fig. 8 is a sectional view taken substantially on line 8—8 of Fig. 6 looking in the direction of the arrows.

Fig. 9 is an elevational view of the cover plate for the rear of the head and the mechanism carried thereby, said plate being shown removed from the head.

Fig. 10 is a sectional view taken substantially on line 10—10 of Fig. 9 looking in the direction of the arrows.

Fig. 11 (Sheet 8) is a detail elevational view of the indicating device shown in other figures as mounted on the head of the machine.

Fig. 12 is a fragmentary detail elevational view of a portion of the upper left-hand part of the apron of the machine shown in Fig. 1, but showing a different kind of control in the form of a dial indicator.

Fig. 13 is a top plan view of the control and indicator shown in Fig. 12 and is on an enlarged scale.

Fig. 14 is a fragmentary front elevational view of a portion of a machine tool, such as is shown in Fig. 1, and illustrates a modified form of the invention from those which have been previously illustrated.

Fig. 15 is an end elevational view of the machine shown in Fig. 14 and is taken looking from the right-hand side of Fig. 14.

Fig. 16 is a fragmentary developed view of the change speed gearing in the head shown in Figs. 14 and 15.

Fig. 17 (Sheet 3) is a sectional view taken substantially on line 17—17 of Fig. 16 looking in the direction of the arrows and shows an automatic pick-up clutch.

Fig. 18 is a fragmentary sectional view taken substantially on line 18—18 of Fig. 16, looking in the direction of the arrows, with the shafts shown, not in an developed view, but in their proper relative positions.

Fig. 19 (Sheet 6) is an elevational view of the cover plate for the rear of the head and is similar to Fig. 9, but has associated therewith a diagrammatic illustration of the wiring circuits, switches, etc., employed in the form of the invention disclosed in Fig. 14, a portion of such illustration constituting a section taken substantially on line 19—19 of Fig. 14, looking in the direction of the arrows.

Fig. 20 (Sheet 2) is a detached view of the control lever on the apron in the modification shown in Fig. 14, and shows by means of dot and dash lines the extreme and intermediate positions of the control lever.

Fig. 21 is a developed diagrammatic view of a modified form of the invention and discloses the change speed gearing in the head together with an infinitely variable speed changing drive for the gearing, as well as preselecting means for the change speed gearing and the infinitely variable speed drive, and Fig. 22 is a view similar to Fig. 21 but shows a different form of the invention from that disclosed in Fig. 21 in that separate preselecting means are employed for the change speed gearing and the infinitely variable speed drive together with an indicating device operatively connected with both of the preselecting means and capable of giving a combined reading.

The portion of the machine tool shown in Fig. 1 is, in this instance, a lathe and comprises a bed 30, on one end of which is a head 31 having a rotatable work spindle 32. The bed 30 is provided with ways on which is mounted a carriage 33 for a cross slide 34, the apron 35 of the carriage extending downwardly of the front side of the bed. The carriage 33 is moved along the ways of the bed by means of mechanism associated with the usual feed shaft 36 which is operatively connected with the spindle 32 so as to rotate in timed relation therewith as is well known in the art.

Reference should now be had to Fig. 5 showing a developed illustration of the change speed gearing in the head for driving the spindle 32. A pulley 37a, which may be connected to any suitable source of power, is fixed on a shaft 37 which has freely rotatable thereon in spaced relation clutch members 37b and 37c, while a shiftable clutch member 37d is splined to the shaft and located intermediate the clutch members 37b and 37c. The clutch member 37d has an overtravel past its clutching engagement with the clutch member 37b, for a purpose later to be explained, and since such an arrangement is well known in the art it has not been illustrated herein. The clutch member 37c has formed thereon a gear 37e which meshes with a gear 38a fixed on a shaft 38. A three step gear cone is splined to the shaft 38 and comprises gears 38b, 38c and 38d which can be brought into mesh, respectively, with gears 39a, 39b and 39c fixed to a shaft 39, wherefore the shaft 39 can be driven from the shaft 37 at three different speeds when the clutch members 37d and 37c are operatively associated. A gear 39d also fixed to the shaft 39 and the gear 39a are adapted to be selectively intermeshed with gears 40a and 40b on a two-step gear cone splined to a shaft 40 to rotate therewith and move endwise thereof, whereby the shaft 40 may be driven from the shaft 37 at any one of six speeds.

The shaft 40 is provided with a second two-step gear cone splined thereto and having the gears 40c and 40d formed thereon and adapted to be selectively meshed with gears 32a and 32b fixed on the spindle 32, wherefore the spindle 32 may be driven from the shaft 37 at any one of twelve different speeds.

In order to facilitate the shifting of the shiftable gear cones hereinbefore described when varying the speed of the spindle and so that the various gears will readily engage without clashing, it is proposed to provide means in the drive for slowly and positively moving the gear train preparatory to changing from one spindle speed to another and said means will now be described.

The clutch member 37b is provided with a gear 37f adapted to mesh with a gear 41a freely rotatable on a shaft 41 and having on its opposite sides clutch teeth 41b and 41c, so that the gear 41a forms a clutch member. The gear 41a is substantially wider than the gear 37f so that it can be shifted axially of the shaft 41 into clutch engaging positions and still remain intermeshed with the gear 37f. The clutch teeth 41b are adapted to be engaged with clutch teeth 41d formed on the end of a flanged sleeve 41e that is freely rotatable on the shaft 41, it being noted that in Fig. 5 the clutch teeth 41b and 41d are shown in intermeshed position. The flange of the sleeve 41e is provided with a plurality of circumferentially spaced bearing pins, upon each of which are rotatably mounted gear clusters having gears 41f and 41g, with the gears 41f of each cluster having one tooth more than the gears 41g of each cluster. The gears 41f mesh with an internal gear formed on a sleeve 41h carried by the flanged sleeve 41e but held against rotative movement thereon by means of a stationary pin 31a carried by the head 31. The gears 41g of each cluster mesh with an internal gear formed on a flanged sleeve 41i which is keyed to the shaft 41.

It will be seen that when the sleeve 41e is rotated that the gears 41f of the clusters travel around the internal gear on the stationary sleeve 41h and since the gears 41g are one tooth less than the gears 41f there will be a rotative displacement of the sleeve 41i one tooth during each revolution of the cluster gears, wherefore a slow rotative movement will be imparted to the shaft 41 in a direction opposite to the rotation of the gear 41a.

The shaft 41 has fixed thereto a gear 41k which meshes with a gear 38e fixed on the shaft 38, it being understood that in the developed view of Fig. 5 the gear 41k is spaced from the gear 38e, but upon reference to Fig. 6 the proper relative positions of the shafts 38, 37 and 41 will be observed.

It should also be noted by reference to Figs. 6 and 7 that the shaft 41 is supported in a bearing lug 31b formed on the rear of the head and in a bearing boss 31c formed on the end wall of the head.

It will be understood that assuming the gear 41a to be clutched to the sleeve 41e, as illustrated in Fig. 5, that as soon as the shiftable clutch member 37d has been moved into clutching relationship with the clutch member 37b the shaft 41 will be slowly rotated and through the gear 41k meshing with the gear 38e and rotating in the same direction as the gear 37e a slow forward movement will be imparted to the change speed gearing and to the work spindle 32, at which time the shiftable gear cones previously referred to may be readily shifted without the clashing of gears.

When the clutch teeth 41c on the gear 41a are engaged with the clutch teeth 41m on the adjacent side of the gear 41k and the clutch member 37d is in engagement with the clutch member 37b, then the gears 41k and 41a act as an idler between the gear 37f and the gear 38e to effect a reverse rotation for the shaft 38, the change speed gearing, and the work spindle 32, wherefore the spindle 32 may be operated at twelve different speeds in the reverse direction.

It will be understood that in the condition just described the sleeves 41e, 41h and 41i have no driving function, and that when the shiftable clutch member 37d is moved in either direction, forward or reverse drives for the change speed gearing and the spindle are obtained without any slow driving movement.

Under most circumstances the gear 41a will be clutched to the sleeve 41e so that a slow forward drive can be obtained preparatory to shifting the gear cones to change the speed of the spindle. However, in some instances, such as in backing off taps and dies after a threading operation it is necessary to have a reverse rotation of the spindle. Consequently, in order to facilitate the operation of the machine a short lever 42 is mounted on the front of the head in a convenient position for the operator, and said lever is fixed to a shaft 42a which extends through the head and outwardly of the rear side thereof and carries at its outer end a lever 42b which has an arm operatively connected with a sliable shaft 42c extending into the head stock and carrying a yoke 42d straddling the gear 41a.

It will be seen when the lever 42 is moved to one of its extreme positions as, for example, the position indicated S. F. (slow forward) in Fig. 1 that the gear 41a will be clutched to the sleeve 41e, while when the lever 42 is moved to its other extreme position, namely, that designated R.

(reverse) in Fig. 1 then the gear 41a will be clutched to the gear 41k for the reverse drive.

The shiftable clutch member 37d is moved by means of a yoke 43 which is fixed to a slidable rod 43a extending through the head and outwardly of the end thereof. The outwardly extending end of the slidable rod 43a has an operative connection with a lever arm 43b which is fixed to the end of a rockable shaft 43c extending from adjacent the rear side to the front side of the bed, and provided at its front end with a bevel gear 43d fixed thereto. The gear 43d meshes with a similar bevel gear 44a fixed to a spline-shaft 44 which is rockably supported on the front of the bed and extends longitudinally thereof parallel to the ways of the machine and through the apron 35. The spline-shaft 44 while rockably supported on the front of the machine is held against endwise movement thereon by means of the gear 44a and a lever arm later to be referred to. A lever 45a supported in the apron 35 and held against endwise movement relative thereto, is splined on the shaft 44 to rock therewith and move endwise thereon. The outer end of the lever 45a is pivotally connected to the lower end of a link 45b extending upwardly of one end of the apron and having its upper end pivotally connected to one arm of a bell crank control lever 45 which is rockably supported on the apron.

It will be seen that when the control lever 45 is moved in a plane at right angles to the ways that the shaft 44 will be rocked in a direction depending upon the movement of the control lever and through similar gears 44a and 43d a rocking movement will be imparted to the shaft 43c with a resultant sliding movement of the rod 43a and the yoke 43 to shift the movable clutch member 37d into clutching engagement with the clutch members 37c or 37b or into a neutral or inactive position.

It will be understood that suitable spring points are provided on the lever 45 or some place in the mechanical connection between the lever and the shiftable clutch member to hold the shiftable clutch member in the various positions in which it is moved by the movement of the lever, and inasmuch as the spring points referred to are so well known in the art they will not be illustrated herein.

It will be understood that when the control lever 45 is moved from neutral position (position N) to position A that a forward drive is imparted to the change speed gearing and spindle through the clutch members 37d and 37c and when the lever is moved in the opposite direction from neutral to position B a reverse drive is imparted to the change speed gearing and spindle through the clutch members 37d and 37b and the gears 37f, 41a and 41k, provided the lever 42 previously referred to, is in the position indicated by R. in Fig. 1.

When the lever 42 is in the position as shown in Fig. 1 and indicated by S. F., then the movement of the control lever 45 from neutral into position B, just referred to, will result in a slow forward movement of the change speed gearing and the spindle instead of a reverse movement thereof, this slow forward movement being effected, it will be remembered, through the clutch members 37d and 37b, the gears 37f and 41a and the reduction gearing carried by the sleeves 41e and 41i.

The mechanism for varying the spindle speeds by moving the shiftable gear cones of the change speed gearing and the mechanism for preselecting during one operative step the spindle speed for the next operative step will now be described.

The three-step gear cone on the shaft 38 is shifted by means of a yoke 46 which straddles the gear 38c of the gear cone and is slidably mounted on a rod 46a supported in suitable bosses in the head (see Figs. 6 and 8). The yoke 46 is provided with an upwardly projecting boss which carries a centrally arranged pin 46b, for a purpose later to be explained. It will be understood when the yoke 46 is shifted to any one of three different positions that the gears on the three step gear cone are intermeshed with one or another of three of the gears on the shaft 39, as previously described.

The rear two-step gear cone on the shaft 40 is shifted by means of a yoke 47 straddling the gear 40a of the two-step gear cone and formed on a sleeve which is slidable on a rod 47a supported in suitable bosses in the head. The underside of the yoke is provided with a slot in which is located the end of a lever arm 48, carried by a sleeve 48a which is freely rotatable on a vertically extending shaft 49 mounted in suitable supports formed on a cover plate 31d secured to the rear of the head. The lower end of the sleeve 48a is provided with a lever arm 48b which carries on the underside of its outer end a downwardly projecting boss provided with a centrally arranged pin 48c. It will be noted that the lower end of the sleeve 48a has a heel portion which engages the upper side of a lug formed on the cover plate 31d, wherefore the sleeve 48a is maintained in its proper vertical position.

It will be understood that when the lever arm 48b is rocked the yoke 47, through the sleeve 48a and the lever arm 48, will be shifted to move the rear two-step gear cone to one or the other of its two operative positions.

The front two-step gear cone on the shaft 40 is shifted by means of a yoke 50, slidably supported on the rod 47a and straddling the gear 40c of the front two-step gear cone. The yoke 50 is pivotally connected to one end of a link 50a, the opposite end of which link is pivotally connected to the end of a lever arm 50b, having a hub portion fixed on the shaft 49 above the sleeve 48a.

A lever arm 49a has a hub portion at one of its ends which is fixed to the lower end of the shaft 49, while the outer end of the lever arm is provided with an upwardly extending boss carrying a centrally arranged pin 49b. It will be seen when the lever arm 49a is rocked, the shaft 49 will also be rocked and through the lever 50b, which is operatively fixed to the shaft and the link 50a, a movement will be imparted to the yoke 50 to shift the front two-step gear cone into either one of two operative positions and into a neutral or inoperaive position when it is desired to disconnect the work spindle from its driving train for purposes of loading or unloading.

In order to shift the pins 46b, 48c and 49b and the levers and gear cones associated therewith to change the speed of the spindle, a pair of endwise shiftable and rotatable indexible spools 51 and 51a are provided. These spools are identical in function with the preselecting spools illustrated and described in the copending application of Max E. Lange, Serial No. 8,319, filed February 26, 1935, and are provided on their adjacent faces with series of long and short, short and long projections and projections of equal length, substantially as are the spools shown in the copending Lange application just referred to. It will be understood that most of the long and short and short and long projections on both spools are used for shifting the two two-step gear cones while the remaining projections including those of equal length are used for shifting the three-step gear cone.

It will be understood that the spools 51 and 51a are rotated when in their outermost positions, as illustarted in Fig. 8, to bring desired pairs of the projections of unequal length or of equal length into operative relationship with respect to one or more of the pins 46b, 48c and 49b, and that when the spools move endwise toward each other such projections will engage the pins and cause a predetermined movement thereof which will effect the desired shifting of one or more of the gear cones in the change speed gearing.

The spools 51 and 51a are splined to a rotatable shaft 52 mounted in suitable bearing bosses formed in the head to move endwise of the shaft and to rotate therewith. The shaft 52 projects beyond the end of the head stock and has fixed on its projecting end a spiral gear 52a which meshes with a similar spiral gear 53a fixed on a rotatable vertically extending shaft 53 arranged near the rear side of the machine as shown in Fig. 3. This shaft 53 carries at its lower end a bevel gear 53b which meshes with a similar bevel gear 54a fixed on a rotatable horizontal shaft 54 which extends through the bed to the front side of the machine and has fixed at its front end a bevel gear 54b. The gear 54b meshes with a bevel gear 55a fixed to a horizontally extending rotatable spline shaft 55 mounted on the front of the machine below the shaft 44, previously referred to and parallel thereto and held against endwise movement. The shaft 55 extends through a sleeve 55b which is carried by a lug 35a formed on the underside of the apron 35 and said sleeve 55b is held against endwise movement in the lug and is provided at one end with a bevel gear 55c, as clearly illustrated in Figs. 1 and 4. The bevel gears 55c meshes with a bevel gear 56a fixed to the lower end of a vertically extending rotatable shaft 56 mounted in the apron 35 and carrying at its upper end on the top side of the apron a hand operating wheel 56b.

It will be seen that when the hand operating wheel 56b is turned rotative movement will be imparted through the gearing just described to the shaft 55 and the shafts 54 and 53 to the spiral gear 52a on the shaft 52, wherefore the spools 51 and 51a will also be rotated.

It will be understood that suitable spring points will be provided in connection with the hand operating wheel 56b, wherefore said wheel can be turned to its various positions of adjustment and held in such positions, but such spring points being well known in the art are not illustrated.

The upper end of the shaft 53, as shown in Fig. 3, is provided with a reduced portion having a coupling 53c which operatively connects the shaft 53 with a vertically extending shaft 57 which has fixed to the upper end a bevel gear 57a. The bevel gear 57a meshes with a bevel gear 58a fixed to the rear end of a rotatable shaft 58 arranged above the head 31 and extending toward the front side thereof, it being noted that both the shafts 57 and 58 are supported in suitable bearing portions formed on a bracket secured to the rear portion of the head. The forward end of the shaft 58 is operatively connected with an indicating device 59 mounted on the top of the head adjacent the front of the machine and illustrated in a detached way in Fig. 11.

The indicating device 59 is shown as substantially identical with the indicating device illustrated and described in the copending application of Max E. Lange, Serial No. 44,518, filed October 4, 1935, and is designed to indicate cutting speeds in feet per minute for different diameters of work in relation to spindle speeds and also to indicate the sequential operative steps in a complete work cycle in relation to the spindle speeds used in such steps, wherefore the indicating device comprises a production log.

It will be seen when the hand operating wheel 56b on the apron is turned to preselect during one operative step the spindle speed for the next operative step, that the spools 51 and 51a will be rotated to the predetermined position and that automatically and simultaneously with the rotation of the spools the indicating device 59 will be actuated to show the spindle speed thus preselected in relation to the operative step of the work cycle. In actual practice the operator will turn the hand wheel 56b until the desired spindle speed appears on the indicating device 59, at which time the preselecting spools will have been properly positioned so that when said spools are moved endwise toward each other one or more of the gear cones will be shifted to obtain the preselected spindle speed. Of course, as explained in the said Lange application, Serial No. 44,518, when the spindle speeds for the different operative steps in the complete work cycl have been determined and the numbers representing such operative steps properly positioned on the indicating device to form a production log, the operator need merely turn the hand wheel 56b to bring the numbers of the different operative steps into line with the pointer on the indicating device in preselecting the spindle speeds for the next operative step.

In place of the operating hand wheel 56b, as shown in Fig. 1, an operating knob 60 provided with an indicating dial 60a may be secured to the upper end of the shaft 56 and the dial 60a can bear indicia representing the different spindle speeds, wherefore the operator can rotate the knob and dial to bring the indicia representing the desired spindle speed to be preselected into alignment with a pointer 60b located on the upper side of the apron, see Figs. 12 and 13. The knob 60 and dial 60a on the carriage 33 may be employed as supplemental to the indicating device 59 on the head.

In some instances it may be desirable to eliminate the indicating device 59 on the head and its operating shafts and gearing and employ only the knob and dial on the apron to preset the spools 51 and 51a to preselect the spindle speeds, and in such instances the coupling 53c is removed, as are also the shafts 57, 58 and the indicating device 59. It will be understood that although the dial 60a is illustrated as indicating merely the R. P. M. of the spindle, that a more elaborate indicating device can be mounted on the carriage 33 and operatively connected with the shaft 56 and that such indicating device may give the spindle speeds in relation to cutting speeds in feet per minute for the different diameters of work in relation to the various sequential operative steps in the work cycle, and may also indicate the said sequential steps to form a production log similarly as the indicating device 59.

The spools 51 and 51a are moved endwise away from each other to permit indexing of the spools and endwise toward each other to effect the preselected speeds by means now to be described. Vertically spaced parallel rods 61 and 61a are mounted in supporting lugs formed on the inside of the cover plate 31d and are so located as to lie at one side of and above and below the shaft 52 (see Fig. 6). An elongated sleeve 62 is slidably mounted on the rod 61 and has a yoke 62a engaging in a circular groove formed in the spool 51. A similar sleeve 63 is provided with a yoke 63a engaging in a circular groove formed in the spool 51a. An equalizer bar 64 is fixed intermediate its ends on a rockable bearing shaft 64a carried by the cover plate 31d (see Fig. 10) and said bar is provided at its opposite ends with pivoted shoes slidably arranged in slots formed in the sleeves 62 and 63, wherefore it will be seen that when said shaft 64a is rocked a rocking movement will be imparted to the equalizer bar 64 and an endwise sliding movement in opposite directions will be transmitted to the sleeve 62 and spool 51 and sleeve 63 and spool 51a. The shaft 64a projects through the cover plate 31d and has fixed to its projecting end a lever arm 64b which is operatively associated with the lower end of a piston rod 65a connected to a piston 65 forming a part of a double acting hydraulic motor, the cylinder of which is indicated at 65b, see Figs. 9 and 10.

The opposite ends of the cylinder 65b of the hydraulic motor are provided with ports in which are connected conduits 65c and 65d, which conduits extend in any suitable way to a valve body 66 carried by a bracket located on the bed and below the head at the front of the machine and adjacent the end of the shaft 44. The conduits 65c and 65d are connected by means of ports to the opposite ends, respectively, of the valve chamber in which is mounted a movable valve member 66a having at its opposite ends shoulders fitting the bore of the valve body, as will be well understood. An inlet conduit 66b connected to any suitable source of fluid under pressure and an outlet conduit 66c are in communication with the valve chamber intermediate the ends thereof.

It will be seen when the movable valve member 66a is in one extreme position, as indicated in Fig. 2, the conduit 65d is in communication with the inlet conduit 66b and carries the pressure fluid to the hydraulic motor, wherefore the piston 65 is maintained at the upper end of the cylinder 65b, as shown in Fig. 9, thus holding the spools in their outermost position. When the movable valve member 66a is moved to its other extreme position from that just referred to, the conduit 65c is in communication with the inlet conduit 66b, at which time the fluid pressure is applied to the upper side of the piston 65 and the latter is moved to its lowermost position, wherefore the spools 51 and 51a are brought inwardly to actuate the pins 46b, 48c, 49b and, in turn, to shift one or more of the shiftable gear cones in the change speed gearing. A spring 66d is provided in the valve to normally maintain the movable valve member 66a in its lowermost position, as shown in Fig. 2, wherefore the piston 65 is normally in its uppermost position in the cylinder 65b and the spools 51 and 51a are normally held in their most outward position. The movable valve member 66a carries a valve rod 66e which extends below and outwardly of the valve body 66 and is provided at its lower end with a head adapted to be contacted at the outer end with a lever arm 44b fixed to the end of the shaft 44 to rock therewith.

As previously explained, when the control lever 45 is moved to one of its extreme positions, namely, its most inward position with respect to the ways, designated A in Fig. 4, then the main driving clutch 37d, 37c is engaged for the fast forward driving movement of the spindle 32, at which time the shaft 44 has been rocked so that the lever arm 44b has moved from its neutral position, as shown in Fig. 2, away from the head of the rod 66e of the valve. When the control lever 45 is moved in a reverse direction from position A and passes through neutral position, at which time the lever arm 44b is in the position shown in Fig. 2, to a position B as indicated in Fig. 4, then the clutch members 37d and 37b are engaged, and assuming the gear 41a to be clutched to the sleeve 41e, a slow forward movement is imparted to the change speed gearing and the spindle 32. When the control lever reaches position B, the lever arm 44b has been moved into contact with the head of the rod 66e of the valve, wherefore a further movement of the control lever 45 from position B to position C, as shown in Fig. 4, will cause the lever 44b to move the rod 66e and the valve member 66a upwardly against the action of the spring 66d, and thus place the conduit 65c in communication with the inlet conduit 66b, so that the piston 65 of the hydraulic motor will be moved to the lower end of the cylinder 65b and the spools 51 and 51a will be brought endwise toward each other to their most inward position to actuate the pins 46b, 48c and 49b and, in turn, to shift the gear cones to change the spindle speed to the preselected speed.

Since the shifting of the gear cones to obtain the preselected speed takes place during the slow forward drive, the various gears which are shifted will readily intermesh and there will be no clashing of gears. The lever 45 can now be moved from position C to A to disengage the clutch member 37d from the clutch member 37b and to engage it with the clutch member 37c, at which time the first forward and newly obtained spindle speed will become effective, while during such movement of the control lever the lever arm 44b has moved out of engagement with the head of the rod 66e and the valve member 66a has been moved by the action of the spring 66d to the position shown in Fig. 2, wherefore hydraulic pressure is applied to the underside of the piston 65 of the hydraulic motor and said piston resumes the position shown in Fig. 9, and such movement of the piston effects an endwise outward movement of the spools to a position where they may be indexed to preselect the spindle speed for the next operative step.

It will be understood that during the last operative step in the complete work cycle the operating knob 56b is rotated to bring the letter N on the indicating device or dial in view, or in alignment with the pointer 60b to preset the spools for neutral and then upon the completion of the last operative step the operator moves the control lever 45 from position A to position B to initiate the slow forward drive and then to position C to cause the spools to move inwardly to shift the front two-step gear cone to a disengaged neutral position, after which he moves the control lever to position N or neutral to disengage the main driving clutch.

It will be remembered that when the lever 42 is in position R, as shown in Fig. 1, the gear 41a is clutched to the gear 41k, and hence when the clutch member 37d is engaged with the clutch member 37b the change speed gearing and the spindle 32 are driven in the reverse direction. When the lever 42 is thus positioned a movement of the control lever 45 from position N to position B will effect a reverse drive of the spindle. It will be understood that position C of the lever 45 is not employed when the spindle is being driven in the reverse direction, since the reverse drive is utilized merely in backing off taps or dies after a threading operation, and hence there will be no necessity to move the spools inwardly or outwardly to preselect various spindle speeds.

Should the operator accidentally move the control lever 45 beyond position B into position C during the reverse drive of the spindle, only an idle endwise movement of the spools will take place.

It will be seen that in the construction hereinbefore described the operator from his position adjacent the carriage 33 of the cross-slide can preselect during one operative step the spindle speed for the next operative step and can from the same position change from fast forward speed to a slow forward speed and then actuate the preselecting spools to obtain the preselected speed as well as controlling the main drive clutches. The change from the fast forward speed to the slow forward speed preparatory to shifting the gears and the shifting of the gears to the preselected speed as well as the controlling of the main drive clutches is effected by means of a single control lever movable in only one plane, which lever is carried remotely from the head and located on the carriage. Of course it will be understood that the preselecting and indexing of the spools is effected from a remote point by means of the operating hand wheel 56b or the operating knob 60 located on the carriage 33.

It will be understood that although the inward and outward movements of the preselecting spools have been illustrated and described in connection with the first embodiment of the invention as being accomplished by means of a valve controlled hydraulic motor, that electrical, mechanical, or other means might be employed for this purpose.

In Figs. 14 to 20 inclusive a different embodiment of the invention is illustrated from that which has been previously described. The machine shown in the figures just referred to comprises a bed 30a, at one end of which is the head 31e provided with a work spindle 32c. As in the previously described form of the invention, the machine illustrated is a lathe and although not shown is, however, provided with a carriage and apron on the ways for the cross-slide similar to the carriage 33 and the apron 35 previously referred to. The head 31e is slightly different in construction from the head 31 previously described, as will become apparent by reference to Figs. 15 to 19 inclusive, as will shortly be explained, while the bed, slides and other parts of the machine located to the right of section line 3—3 of Fig. 1 are substantially identical with the previously described form.

Referring to Fig. 16, there is shown a pulley 67a fixed on the main drive shaft 67 which is rotatably supported in the head 31e. The shaft 67 is provided with clutch members 67b and 67c, freely rotatable on the shaft and with a movable clutch member 67d splined to the shaft to move endwise thereof and rotate therewith. The clutch member 67b is provided with a gear 67e, while the clutch member 67c is provided with a gear 67f. The latter gear meshes with a gear 68a fixed on a shaft 68. Adjacent the opposite end of the shaft 68 there is a gear 68b fixed to the shaft and which meshes with an idler gear 68c which, in turn, meshes with the gear 67e previously referred to. It will be seen when the clutch member 67d is clutched to the member 67c that the shaft 68 will be directly driven at a comparatively fast rate of speed in the forward direction through the gears 67f and 68a. It will also be seen when the clutch member 67d is clutched to the member 67b that the shaft 68 will be driven at a comparatively fast rate of speed in the reverse direction through the gears 67e and 68b and the idler gear 68c.

The shaft 67 is also provided with a gear 67g fixed to the shaft and which meshes with a gear 69a keyed to a flanged sleeve 69b which has its flange embraced by a sleeve 69c which is held against rotation by means of a pin 31j carried by the head 31e. The flange of the sleeve 69b is provided with a plurality of circumferentially spaced bearing pins each of which carries a cluster gear formed of the gears 69d and 69e with the gears 69d of each cluster having one less tooth than the gears 69e of each cluster. The gears 69d mesh with an internal gear formed on the sleeve 69c, while the gears 69e mesh with an internal gear formed on a flanged sleeve 69f and upon which sleeve the sleeve 69b is freely rotatable. The sleeve 69f is rotatably mounted on an inner sleeve 69g which is keyed to a shaft 69 rotatably mounted in the head. The inner sleeve 69g is provided on its circumference with a plurality of circumferentially spaced wedge-shaped recesses 69h, see Fig. 17, in which are disposed rollers 69i, said sleeves 69f, 69g and the recesses 69h with the rollers 69i constituting a well known form of automatic pick-up clutch. The shaft 69 has freely rotatable thereon clutch members 69j and a clutch member 69k between which clutch members there is a shiftable clutch member 69m splined to the shaft 69 to rotate therewith and move endwise thereof. In engaging the movable clutch member the clutch members 69j, 69k and 69m depart from the standard clutch construction in that an over-travel is permitted to the clutch member 69m when it is moved into engagement with either the clutch member 69j or 69k, that is, the clutch member 69m can be moved a short distance in either direction to engage with either of the clutch members 69j or 69k, and then can be moved a still farther distance in the same direction without affecting the engagement between the clutch members. Inasmuch as the feature of the overtraveling clutch member is well known in the art, specific illustration thereof is deemed unnecessary. The clutch member 69j is provided with a gear 69n meshing with the gear 67e on the shaft 67, while the clutch member 69k is provided with a gear 69o meshing with the gear 67f on the shaft 67.

Assuming that the movable clutch member 67d is in neutral position and disengaged from the clutch members 67b and 67c, and the clutch member 69m on the shaft 69 is brought into engagement with the clutch member 69k, then the drive to the shaft 68 is from the shaft 67, through the gears 67g and 69a, the reduction gearing driving the sleeve 69g at slow speed and through the pick-up clutch to the shaft 69, from whence the drive is through the clutch members 69m, 69k and the gear 69o through gears 67f to the gears 68a on the shaft 68, it being noted that the clutch member 67c and the gear 67f on the shaft 67 form an idler during this drive.

It will, therefore, be seen that the shaft 68 is rotated at a slow speed in the forward direction.

When the shaft 68 is rotating at a slow forward speed through the drive just described and the movable clutch member 67d on the shaft 67 is, in addition, clutched to the clutch member 67c, then the drive is from the shaft 67, through the gears 67f to the gear 68a and is at a fast speed in the forward direction. When this condition occurs the gear 69o on the shaft 69 will, of course, be rotated by the gear 67f and the shaft 69 will be rotated at a fast speed, it being understood that the clutch members 69m and 69k are still engaged, but due to the inherent action of the pick-up previously described, the shaft 69 can rotate at this fast speed with the sleeve 69g rotating freely with the shaft and effecting a disengagement of the rollers of the pick-up clutch, wherefore the reduction gearing carried by the sleeves arranged on the inner sleeve 69g has an idle rotation and no driving function.

Assuming the shiftable clutch member 67d to be disengaged from the clutch members 67b and 67c and that the clutch member 69m is engaged with the clutch member 69j, then a reverse rotation at a slow speed is imparted to the shaft 68 from the shaft 67, through the gears 67g, 69a, the reduction gearing, the pick-up clutch, the sleeve 69g keyed to the shaft 69, the shaft 69, the gear 69n clutched to the shaft and the gear 67e which meshes with the idler gear 68c, it being noted that in this instance the clutch member 67b and its associated gear 67e constitute an idler.

When the shaft 68 is rotating at slow speed in the reverse direction, as just explained, and with the clutch members 69m and 69j still engaged, the additional engagement of the clutch 67d with the clutch member 67b will cause a fast rotation of the shaft 68 in the reverse direction, and inasmuch as the gear 67e is in mesh with the gear 69n which is clutched to the shaft, a fast rotation of the shaft 69 and sleeve 69g will occur, but due to the functioning of the pick-up clutch the reduction gearing carried on the sleeve 69 will simply have an idle rotative and non-driving movement.

The drive to the work spindle from the shaft 68 is identical with the drive to the work spindle from the shaft 38, as illustrated in Fig. 5, it being understood that although the work spindle and shaft having the front and rear two-step gear cone are not shown in Fig. 16, that the three-step gear cone 68d on the shaft 68 will drive the shaft 39, and the gears on this latter shaft will, in turn, drive the front and rear two-step gear cones on a shaft intermediate the shaft 39 and the work spindle, while the said front two-step gear cone is movable to one of two driving positions with relation to the gears on the work spindle or to an intermediate non-driving position.

It will be seen from the foregoing description that the shaft 68 and, in turn, the work spindle can be driven at either a comparatively slow rate in both the forward or reverse directions, or at a comparatively fast rate in both the forward or reverse directions, depending upon whether or not only the clutches on the shaft 69 are engaged or the clutches on the shaft 67 are engaged, in addition to the engagement of the clutches on the shaft 69.

The movable clutch member 67d on the shaft 67 is shifted into engagement with the clutch members 67b and 67c or into a neutral position by means of a yoke 70a fixed to an endwise slidable rod 70 mounted in the head and extending beyond the end thereof in a manner similar to the rod 43a described in connection with the first embodiment of the invention and clearly shown in Fig. 7.

The movable clutch member 69m on the shaft 69 is shifted to either one of its two operative positions or to its inoperative or neutral position by means of a yoke 71a straddling a groove on the clutch member, and fixed to an endwise slidable rod 71 similar to the rod 70 and parallel thereto and extending outwardly of the head. The outwardly extending end of the rod 70 is provided with a slot receiving the end of a short arm lever 72a, while the outer end of the rod 71 is provided with a similar slot receiving the end of a long arm lever 72b, said levers 72a and 72b being formed on a sleeve 72c which is fixed to a rockable shaft 72 extending through the bed and beyond the front side thereof. The front end of the shaft 72 has fixed thereto a bevel gear 72d similar to the bevel gear 43d previously referred to, and meshing with a bevel gear 73a fixed on a spline shaft 73 similar to the spline shaft 44 previously referred to and extending longitudinally of the bed and held against endwise movement relative to the bed. The shaft 73 extends through the apron 35 in the same way as does the shaft 44 and is operatively connected in the same manner with a control lever 74 carried by the apron and connected to the shaft 73 by a link 45b, see Fig. 20, wherein the lever is shown in full lines in its neutral position. When the control lever 74 is moved from position N, as shown in Fig. 20, to position D, a relatively fast forward normal drive for machining the work is given to the spindle, and when the control lever is moved to position E a relatively fast reverse normal drive for machining the work is given to the spindle. When the control lever 74 is positioned at point F intermediate positions N and D, a relatively slow forward gear shifting drive is imparted to the gearing and the work spindle, while when the lever is positioned intermediate positions N and E in position G, a relatively slow reverse gear shifting drive is established to the gearing and the work spindle.

It will be recalled that the rod 71 which carries the yoke 71a for moving the shiftable clutch member 79m is operatively connected to the long lever arm 72b, while the rod 70 which carries the yoke 70a for actuating the movable clutch member 67d is operatively connected to the short lever arm 72a. The clutch members 69m and 67d are arranged to move equal distances from neutral into clutching engagement with their associated clutch members, and the lever arms 72a and 72b are so proportioned as to length that a rocking movement of the shaft 72 imparted by movement of the control lever 74 from position N to position F will result in the long lever arm 72b moving the rod 71 a sufficient distance to cause an engagement of the clutch member 69m with the clutch member 69k to bring about a slow forward drive to the work spindle. This movement of the lever 74 from position N to position F is not sufficient to cause the short lever arm 72a to move the rod 70 so as to engage the clutch member 67d with the clutch member 67c, but the former clutch member has been moved substantially half way to its engaged position. When the control lever 74 is moved from position F to position D, the clutching engagement between the member M and the clutch member 69k is not effected, due to the overtravel previously referred to, while this further movement brings the clutch member 67d into clutching engagement with the clutch member 67c and a relatively fast forward drive is imparted to the work spindle. When the control lever 74 is moved from position D to position F the clutch member 67d is disengaged from the clutch member 67c, while the clutch member 69m stays in engagement with the clutch member 69k, wherefore the slow forward drive to the work spindle is restored, due to the functioning of the pick-up clutch. A movement of the control lever 74 from position F to position N disengages the clutch member 69m from the clutch member 69k and the drive to the spindle is stopped. A movement of the control lever 74 from position N to position G first engages the clutch member 69m with the clutch member 69j and a slow reverse drive is established to the work spindle due to the relative lengths of the levers 72a and 72b. A movement of the control lever 74 from position G to position E brings the clutch member 67d into clutching engagement with the clutch member 67b and a relatively fast reverse drive to the spindle is effected, it being understood that due to the over-travel of the clutch member 69m the latter remains in clutching engagement with the member 69j. Correspondingly when the lever 74 is moved from position E to position G the clutch member 67d is disengaged from the clutch member 67b and a slow reverse drive to the work spindle is reestablished, while movement of the control lever 74 from position G to position N moves the clutch member 69m to disengaged position with respect to the clutch member 69j and the drive to the work spindle is disconnected. It will be understood that suitable spring points are provided to hold the lever 74 in the different positions referred to above.

As previously explained, the purpose of the comparatively slow forward and reverse drives is to enable the gear cones of the change speed gearing to be readily shifted without the clashing of gears and, as will now be explained, the drive to the spindle is changed from the relatively fast drive to the slow drive preparatory to and during the shifting of the gear cones and the moving inwardly of the preselecting spools to obtain the spindle speed which has been preselected.

The preselecting spools just referred to are identical with the spools previously described in connection with the first embodiment of the invention, as are also the different mechanisms for shifting the gear cones of the change speed gearing, and in considering the construction of the spools and the shifting mechanisms reference should be had to Figs. 6 to 10 inclusive previously described. Inasmuch as the preselecting spools are indexed when in their most outward position in the present form of the invention as in the form described previously, the shifting and gearing which operatively connects the spools for indexing with the operating knob or dial on the carriage of the cross-slide are designated by the same reference characters in the present embodiment of the invention as are shown in Figs. 14 and 15. Also, an indicating device 59 mounted on the head may be employed in the present embodiment of the invention and operatively connected with the spool indexing mechanism or such indicating device might be mounted on the carriage or, in lieu thereof, a dial indicating the speed of the spindle can be employed in association with the operating knob and indicating the preselected speed of the spindle.

In the first described embodiment a valve controlled hydraulic motor was employed for imparting the endwise movement to the preselecting spools. In the present embodiment the endwise movement is imparted to the preselecting spools, as a matter of illustration, by an electrical means which will now be explained.

The spline shaft 73 on its end adjacent the gear 73a has fixed thereto a lever contact arm 75 forming a part of a single pole reversing conductor. The lever arm 75 is provided at its end with electrical contacts 75a and 75b, the contact 75a being adapted when the lever arm is moved in one direction to engage a contact 76a carried by a spring contact arm 76, while the contact 75b is adapted to engage, when the lever 75 is moved in the opposite direction, a contact 77a carried by a spring contact arm 77. When the lever 75 is positioned intermediate the two positions just referred to, and as is shown in Fig. 19, the contacts 75a and 75b are disengaged from the contacts 76a and 77a and this relationship occurs when the control lever 74 is in the neutral position. At this time the preselecting spools are held in their most inward position by means of a solenoid 78, see Fig. 19, which magnetically draws a shifting bar 78a downwardly and holds the same in the downward position, such bar 78a having a slot in which the outer end of the lever 64b is operatively located, it being recalled that said lever 64b is connected to the shaft 64a which rocks the equalizer bar 64 for moving the spools inwardly and outwardly. The solenoid 78 is connected with a source of electrical energy through the electrical conduits 78b and 78c. The electrical conduit 78c is provided with a closed relay switch 78d. When the control lever 74 is moved from position N to position F (slow forward) the contact lever arm swings so as to bring the contact 75b into engagement with the contact 77a on the spring contact arm 77. When this occurs a circuit is established from the conduit 78b and 78c through conduits 79a and 78b and through the contact lever arm 75 and spring contact arm 77 and a conduit 79c to a solenoid 79, the establishment of such circuit actuating the relay 78d to open the circuit to the solenoid 78, whereupon the shifting bar 78a which constitutes also the shifting bar for the solenoid 79 is drawn upwardly by the latter solenoid until the lever arm 64b has been moved to the dotted line position of Fig. 19, at which time the preselecting spools have been moved endwise to their most outward position. A further movement of the control lever 74 from position F to position D does not affect the position of the preselecting spools since the circuit remains closed to the solenoid 79 and the further movement of the contact arm 75 merely bends the spring contact arm 77, it being understood that by the time the lever 74 has reached position D the spindle is operating at a fast forward speed and work can be performed on the machine. The machine now is operating and the operator from his position adjacent the cross-slide will preselect the spindle speed for the next operative step in the work cycle by indexing the preselecting spools in the same manner as described in connection with the first embodiment of the invention. As soon as the present operative step is completed the operator first moves the lever 74 out of position D toward position F to initiate the slow forward drive preparatory to changing the spindle speed, and when the lever reaches position F the spring contact arm 77 has straightened out, although its contact remains in engagement with the contact on the lever arm 75. A continuation of the movement of the control lever 74 from position F toward position N first effects a breaking of the circuit to the solenoid 79, whereupon the relay 78d immediately closes the circuit to the solenoid 78 which draws the shifting bar 78a downwardly to cause the spools to move inwardly and to effect a change to the spindle speed which has been preselected by shifting one or more of the gear cones, it being remembered that a slow forward gear shifting drive is being imparted to the work spindle. As soon as the lever 74 reaches position N the gears have been shifted and the slow drive to the spindle is disengaged. The moment that the operator moves the control lever 74 from position N to position D a fast forward drive at the newly obtained and preselected spindle speed is imparted to the spindle, it being understood, however, that in actual practice the movements of the control lever 74 from position D through F to N and from N through F to D constitute slow continuous movements, during which time the slow forward drive is initiated, the spools moved inwardly to shift the gears, the slow forward drive disconnected, the spools moved outwardly and the slow forward drive again initiated and changed into the fast forward drive for the next operative step. It will be seen that irrespective of whether or not the operator moves the control lever 74 fast or slowly that the change speed gears can always be shifted without clashing, since the inward endwise movement of the spools will occur while the slow forward gear shifting drive is taking place.

It is not believed necessary to explain in detail the manner in which the reverse drive and the change of the spindle speeds during the reverse drive are obtained, it being understood that the movement of the control lever 74 from position N to positions G and E is accomplished in the same way as for the forward drives and that such movements bring the contact lever 75 into contact with the spring contact arm 76 to establish the circuit to the solenoid 79 and break the circuit to the solenoid 78.

In Fig. 21 there is diagrammatically illustrated a further embodiment of the invention, wherein the work spindle may be driven at any one of a large number of speeds arranged in an arithmetical progression between a minimum speed and a maximum speed, and such speeds can be preselected during one operative step for the following operative step in the work cycle. This embodiment includes an infinitely variable and gradually accelerated or decelerated drive from the main source of power through variable change speed gearing to the work spindle, and more specifically it includes an infinitely variable and gradually accelerated and decelerated drive from a constant speed motor to a shiftable two-step gear cone, whereby a series of speeds can be imparted to the work spindle when one of the gears of the two-step gear cone is in driving relationship with its mating gear, and a second series in continuation of the first series can be imparted when the other gearing of the two-step cone is intermeshed with its mating gear, whereby a large number of speeds can be imparted to the spindle and arranged in a continuous arithmetical progression.

Referring to Fig. 21, a constant speed power source, in this instance a motor, is indicated at 80, and said motor drives a shaft 80a through a suitable and gradually accelerated or decelerated drive interposed between the shaft 80a and the rotor shaft of the motor, said drive being indicated at 80b and is in the form of a well known variable friction drive, although it will be understood that a variable speed hydraulic drive or other suitable and gradually accelerated or decelerated driving means might be employed.

The shaft 80a is provided with clutch members 80c and 80d which are freely rotatable on the shaft, and with a movable clutch member 80e arranged intermediate the first mentioned clutch members and which is splined to the shaft 80a to move endwise thereon into engagement with the first mentioned clutch members and to rotate with the shaft. The clutch member 80c is provided with a gear 80f which meshes with an idler gear 80g. The clutch member 80d is provided with a gear 80h which meshes with a gear 81a fixed to a shaft 81. The shaft 81 has fixed thereto a gear 81b which meshes with the idler gear 80g, it being understood that Fig. 21 is a developed view and that the idler gear 80g and the gear 80h are in position to mesh directly with the gears 81b and 81a, respectively.

In order that the variable friction drive 80b can impart two superimposed groups of rotative speeds to the spindle shaft a two-step gear cone is splined on the shaft 81 to move endwise thereof and rotate therewith and said gear cone comprises a gear 81c and a gear 81d adapted to be intermeshed, respectively, with gears 82a and 82b fixed on the work spindle 82. The mechanism for varying the friction drive 80b and for shifting the two-step gear cone on the shaft 81, as well as the mechanism for preselecting, during one operative step, the spindle speed for the next operative step will now be described.

The actuating shaft for controlling the variable friction drive 80b is provided with a pinion 83 which meshes with a rack formed on an endwise shiftable rod 83a, which rod has fixed thereto a block carrying a pin 83b. The two-step gear cone on the shaft 81 is shifted to either of its two operative positions by means of a yoke 84 which straddles the gear 81c and is carried by a sleeve 84a that is endwise shiftable on a rod 84b, it being noted that said sleeve 84a is provided at its opposite ends with parallel laterally extending pin portions or fingers 84c and 84d. As shown in the developed view, a rotatable shaft 85 is mounted in the head intermediate the shaft 80a and the rod 84b and said shaft 85 is provided with endwise movable spools 85a and 85b which are splined to the shaft to rotate therewith and move endwise thereon. The spools 85a and 85b are each provided on their adjacent faces with a long projection and a short projection, and said short projection on the one spool cooperates with the long projection on the other spool and the long projection on the first spool with the short projection on the second spool and said projections extend substantially 180° in width around the circumference of the spools. The adjacent ends of the projections are formed on a spiral curve, wherefore when the spools are brought together, as shown in Fig. 21, a spiral groove or recess extends around the spools between their adjacent ends and the pin 83b carried by the sleeve which is fixed to the rod 83a is located in this groove or recess.

It will be seen when the spools 85a and 85b are moved endwise outwardly, then indexed or rotated to vary the location of the long and short projections circumferentially of the spools and then brought inwardly, the pin 83b will be shifted between minimum and maximum limits depending upon the amount of rotation which has been imparted to the spools, and such shifting of the pin 83b will cause an endwise movement of the rod 83a and a variation of the friction drive 80b between minimum and maximum limits. The spools 85a and 85b in addition to the long and short projections previously referred to, are also provided with projections indicated at 85c and 85d, and said projections are of equal length and are spaced circumferentially of the spools 180° with respect to each other.

It will be noted that the projections 85c and 85d lie radially outwardly of the projections previously referred to, that is, the projections of equal length are superimposed upon the first mentioned projections and constitute what might be termed a second or outer layer of projections. The projections 85c and 85d are of such length that the distance between the end of each projection and the rear end of the other spool when the spools are in their most inward position is substantially equal to the length between the outer sides of the pins or fingers 84d and 84c on the sleeve 84a, as clearly shown in Fig. 21, wherefore when the spools are moved outwardly and indexed 180° and then moved inwardly, one or the other of the projections 85c or 85d will engage one or the other of the pins or fingers 84c and 84d and shift the sleeve 84a to shift the two-step gear cone on the shaft 81 and to bring either the gear 81c or the gear 81d into intermeshing relationship with its mating gear on the spindle.

The spools 85a and 85b, as well as the movable clutch members 80e, can be shifted axially of their supporting shafts by mechanism similar to the mechanism shown in Figs. 8 to 10 inclusive, it being understood that the spools may be shifted either hydraulically, electrically or mechanically as heretofore explained, and also, if desired, the slow positive drive, so that the gears may be shifted without clashing. The shaft 85 is rotated to index the spools 85a and 85b when the latter are in their outermost position by means of an operating knob 85e fixed to the outer end of the shaft and having associated therewith a dial 85f which carries on its periphery indicia representing the spindle speeds.

From the foregoing description it will be clearly evident that when the gear 81c of the two-step gear cone is intermeshed with the gear 82a that the spools can be moved outwardly and indexed through an arc lying within 180° and when the spools are again brought inwardly at any time within the arc of 180° there will be no shifting movement imparted to the sleeve 84a or to the two-step gear cone, and consequently the spindle will always be driven by the gear 81c as long as the spools are indexed within the 180° referred to. However, during the indexing of the spools within the said 180° arc the variable friction drive 80b will be changed when the spools are brought inwardly, wherefore said drive will impart, during the 180° movement of the spools, a large number of different driving speeds to the work spindle lying between minimum and maximum limits of the variable friction drive and arranged in an arithmetical progression. However, when the spools are indexed beyond the said 180° to render the projection 85d active a similar progression of spindle speeds will be imparted by the friction drive between minimum and maximum speeds, due to the fact that a similar set of inner projections are on the spools, but since the spools have been indexed, as stated above, the outer projection 85c on the spool 85b has moved out of alignment with the finger 84c on the sleeve 84a and the other outer projection 85d on the spool 85a brought into alignment with the finger 84d on the sleeve, consequently when the spools are moved inwardly toward each other the sleeve 84a and the two-step gear cone will be shifted to effect an intermeshing relationship between the gear 81d on the cone and its mating gear 82b on the spindle. The gear ratio between the two-step gear cone and the respective mating gears on the spindle is such that when the maximum speed of the low gear ratio group has been obtained and the gear cone is shifted, the minimum speed of the high gear ratio group will lie in the arithmetical progression above the first mentioned maximum speed and the two groups together constitute a continuous series of progressive speeds.

It will be understood that wherever necessary suitable spring points will be provided to hold the parts in their various adjusted positions.

The modification shown in Fig. 22 is similar to the form shown in Fig. 21, with the exception that two pairs of spools are employed which have the cooperating projections thereon arranged in single layers, and further the shiftable change speed gearing in the drive to the spindle imparts various speeds thereto arranged in a geometrical progression, while the infinitely variable friction drive imparts to the spindle multiple speeds arranged in an arithmetical progression within a minimum and maximum limit and located between adjacent speeds of the series of speeds that are arranged in a geometrical progression.

As in the form of the invention illustrated in Fig. 21 and previously described, a constant speed power source, in this instance a motor 86 is employed and drives a shaft 86a through a variable friction drive indicated at 86b and of well known construction and similar to the drive 80b previously referred to. The shaft 86a is also provided with clutch members 86c and 86d freely rotatable on the shaft, while a movable clutch member 86e is splined to the shaft intermediate the clutch members 86c and 86d. The clutch member 86c is provided with a gear 86f, which meshes with an idler gear 86g, while the clutch member 86d is provided with a gear 86h that directly meshes with a gear 87a fixed to a shaft 87. The idler gear 86g, previously referred to, meshes with a gear 87b fixed to the shaft 87, while intermediate the gears 87a and 87b a three-step gear cone is splined on the shaft 87 and includes the gears 87c, 87d and 87e adapted to mesh, respectively, with gears 88a, 88b and 88c fixed on a shaft 88. The shaft 88 has splined thereon a two-step gear cone formed of the gears 88d and 88e which mesh respectively with gears 89a and 89b fixed on the work spindle 89.

The variable friction drive 86b is controlled by means of a pinion 90 which meshes with a rack portion formed on an endwise shiftable rod 90a which carries a block fixed thereto and provided with a pin 90b. The pin 90b extends laterally from the rod and lies between the adjacent faces of spools 91a and 91b mounted on a rotatable shaft 91 for movement endwise thereof and for rotation therewith. The spools 91a and 91b on their adjacent faces are each provided with a pair of cooperating long and short projections, the ends of which are curved to form, when the spools are brought inwardly, a spiral groove extending around the spools through an arc of 360° and extending axially of the spools from the shortest projection on the one spool to the shortest projection on the other spool. Inasmuch as the pin 90b is located between the spools and in the spiral groove when the spools are in their most inward position, as shown in Fig. 22, it will be seen when the spools are moved endwise outwardly they can be indexed through an arc of substantially 360°, and then when they are moved inwardly a shifting movement can be imparted to the pin 90b and the rod 90a between minimum and maximum limits with a consequent variation in the friction drive between minimum and maximum limits, provided that the pin at the beginning of the indexing movement is located at one or the other end of the groove.

The three-step gear cone on the shaft 87 is shifted to any one of its three operative positions by means of a yoke 92 straddling the gear 87d and formed on a slidable sleeve 92a mounted on a rod 92b, it being noted that said sleeve 92a is provided with a laterally projecting pin 92c similar to the pin 46b carried by the yoke 46 and shown in Fig. 6, it being recalled the present view is a diagrammatic developed view. The two-step gear cone on the shaft 88 is shifted to either one of its two operative positions by means of a yoke 93 formed on a slidable sleeve 93a mounted on the rod 93b. Said sleeve 93a has one of its ends pivotally connected to a link 93c similar to the link 50a shown in Fig. 7, while said link is pivotally connected to a lever arm 93d formed on a sleeve that is fixed to a vertically extending rockable shaft 93e and corresponding to the lever 50b and shaft 49, as clearly shown in Fig. 6, it being understood that in the developed view of Fig. 22 a portion of the lever 93d is shown in dotted lines adjacent the link 93c. The lower end of the shaft 93e has a sleeve fixed thereto which is provided with a lever 93f corresponding to the lever 49a and provided with a pin 93g corresponding to the pin 49b and located between the adjacent faces of the endwise movable spools 94a and 94b splined on the shaft 94 to rotate therewith and move endwise thereon.

The spools 94a and 94b are substantially the same as the spools in the copending application of Max E. Lange, Serial No. 8,319 or the spools 51 and 51a previously described and illustrated in Figs. 7 and 8, it being remembered that these spools are provided with cooperating long and short projections, short and long projections and projections of equal length, whereby when the spools are in their outermost position and are indexed and then brought inwardly the cooperating pairs of projections will engage one or both of the pins 92c and 93g to shift one or both of the gear cones on the shafts 87 and 88 to vary the speed of the work spindle 89.

The gear ratio in the change speed gearing to the spindle is such that the shifting of the three-step gear cone on the shaft 87 and the two-step gear cone on the shaft 88 can effect six different spindle speeds arranged in a geometrical progression, it being recalled that the variation of the variable friction drive 86b can effect an infinite number of gradually accelerated or decelerated speeds to the shaft 87 and arranged in an arithmetical progression which can be superimposed upon the spindle between adjacent speeds of the geometrical progression, thus forming a continuous series of gradually accelerated or decelerated speeds for the work spindle lying between minimum and maximum limits and between the speeds imparted thereto by the change speed gearing and arranged in geometrical progression.

The spools 94a and 91b and the spools 94b and 91a are operatively interconnected so that they can be moved in unison endwise on their supporting shafts by mechanism similar to the mechanism shown in the form of the invention illustrated in Figs. 6 to 10 inclusive, and actuated either hydraulically, electrically or mechanically, as explained above.

The shaft 94 is rotated by means of an operating knob 94c to index the spools 94a and 94b when the latter are in their most outward positions. The shaft 94 is also provided inwardly of the operating knob 94c with a dial 94d mounted to rotate with the shaft and carrying upon its periphery in spaced relation indicia representing the spindle speeds obtained from the change speed gearing and arranged in geometrical progression, while intermediate such indicia the periphery of the dial is provided with indicia representing the spindle speeds obtainable through the variable friction drive and arranged in an arithmetical progression, it being noted, for purposes of illustration, that the dial as shown in Fig. 22 discloses in large lettering the spaced numbers 120 and 140 forming two steps of the geometrical progression, while intermediate these numbers the smaller lettering is located and represents the spindle speeds in the arithmetical progression, in this instance, each small division indicating two revolutions increase in the spindle speed. Mounted to rotate freely on the shaft 94 and surrounding the drum 94d is a housing 94e provided with a knob 94f and with a window overlying the periphery of the dial and of a length greater than one-sixth of the periphery of the drum, said window being provided with a hair line cross member 94g substantially midway of the window. The housing 94e also is provided with a gear 94h which meshes with a gear 91c fixed on the end of the shaft 91, the ratio between the gears 94h and 91c being six to one.

It will be seen that when the housing 94e is rocked by the knob 94f so as to move the hair line cross member 94g from one speed of the geometrical progression to the next speed, or as herein shown from 120 to 140 or vice versa, that the gear 91c and the shaft 91 will be rotated a complete revolution, wherefore the spools 91a and 91b can be indexed to move the pin 90b from minimum to maximum and a consequent variation of the variable friction drive 86b from minimum to maximum or maximum to minimum will be effected.

While the machine is operating during one operative step the operator in order to preselect a spindle speed of 125 R. P. M., for example, it being understood that the spools are in their most outward position, rotates the knob 94c to index the spools on the shaft 94 and until that portion of the periphery of the dial 94d on which the spindle speeds 120 and 140 are located comes beneath the window of the housing 94e, it being understood, of course, that the spindle speed of 125 R. P. M. lies between the speeds 120 R. P. M. and 140 R. P. M. of the geometrical progression. The operator then rotates the housing 94e by the knob 94f to bring the hair line 94g intermediate the numbers 124 and 126 on the dial, such rotation of the housing it being recalled resulting, through the gears 94h and 91c, in an indexing movement to the spools 91a and 91b. The preselecting of the spindle speed for the next operative step has now been completed and when said operative step is finished the operator effects an inward movement of the spools 94a and 94b and 91a and 91b to bring about the shifting of the three and two-step gear cones and a variation in the friction drive to change the spindle speed to the preselected speed, the parts now being in the positions indicated in Fig. 22. Of course when the spindle speed of 125 R. P. M. is preselected the variable friction drive will be set substantially one fourth way from the minimum limit, and it will be understood that should speeds more nearly approaching the speed of 120 or more nearly approaching 140 be preselected the rotation of the housing 94e to bring the hairline 94g into alignment with the required speed would cause a setting of the variable friction drive toward minimum or maximum limits or toward an intermediate point as the case might be. The various parts referred to above may be held in their different adjusted positions by suitable spring points.

From the foregoing description of the various forms of the invention illustrated herein, it will be seen that a machine constructed in accordance therewith is provided with means for facilitating the shifting of the change speed gearing for varying the rate of movement of the spindle or some other movable part of the machine tool, and that such means embodies provision for initiating a slow power drive to the spindle and the change speed gearing, preparatory to and during the shifting of the gear cones, whereby the gearing when it is shifted can be readily intermeshed without clashing.

It will also be noted that the means for effecting this slow power drive just referred to in one instance is effective during the forward drive only, and in another instance is effective during both the forward and reverse drives, while in all instances such means is controlled by the same means that actuates the shifting of the gearing after actuation of the preselecting means.

It will further be remembered that the mechanism for initiating the slow drive of the change speed gearing preparatory to and during the shifting of the same is controlled by a control lever movable in one plane only and that such movement first initiates the slow drive and then effects the shifting of the gears to obtain the preselected speeds. Furthermore, it will be remembered that in accordance with the invention a machine tool is provided wherein the varying rates of movement for a movable part of the machine can be preselected during one operative step for the next operative step, and wherein an indicating device is provided, together with control means for the preselecting means located remotely with respect to the movable part and operatively connected with the indicating device, thereby increasing the efficiency of the machine by facilitating its control and operation.

In addition to the advantages above set forth it should be noted that in certain embodiments of the invention there is provided means for imparting to the movable part of the machine tool an infinite number of different rates of movement, which in one instance are arranged in an arithmetical progression between minimum and maximum limits and in another instance are arranged in a combination of geometrical and arithmetical progressions, resulting in a continuous series of spindle speeds from minimum to maximum, and that such embodiments of the invention include in addition to the change speed gearing drive a gradually accelerated or decelerated drive for the change speed gearing, such as a variable friction drive, a variable speed hydraulic motor, or other suitable and similar devices of this character.

It will be understood that although the specific illustrations of the present application have related to the drive for the work spindle in the head stock as being the movable part of the machine, that the various features of the invention in part or in their entirety might equally as well be applied to some other movable part of the machine wherein the rates of movement of such part are to be varied during the different operative steps of a work cycle.

Although several embodiments of the invention have been illustrated and described herein, it should be understood that the invention is susceptible of various modifications and adaptations within the scope of the appended claims.

Having thus described our invention, we claim:

1. In a machine tool having a part to be moved in opposite directions and a substantially constant speed power source, change speed gearing for varying the rate of movement of said part in both directions, means interposed between said power source and said change speed gearing for starting, stopping and reversing the drive to said change speed gearing, a control member for controlling said means, and means for selectively imparting to said part through said change speed gearing and the first-named means either a normal reverse drive to said gearing and part or a relatively slow forward drive to said gearing and part and controlled in part by a movement of said control member to the reverse position.

2. In a machine tool having a part to be moved in opposite directions at different rates, power means for moving said part, change speed gearing for varying the rate of movement of said part in both directions, a secondary drive interposed between said power means and said change speed gearing for imparting a relatively slow forward movement to said gearing and said part, means for starting, stopping and reversing the operation of said change speed gearing, said secondary drive being operatively associated with said last-named means, and means for selectively rendering said secondary drive operative or inoperative when said last-named means is in the reverse position.

3. In a machine tool having a part to be moved at different rates in opposite directions, power means, change speed gearing for moving said part at different rates in opposite directions, a secondary drive to said part operating through said change speed gearing for imparting thereto and to said part a relatively slow forward drive, clutch means interposed between said power means and said change speed gearing for starting, stopping and reversing the latter, said secondary drive being operatively associated with said clutch means and including an independent clutch means, and control means for said independent clutch means whereby said secondary drive can be selectively and operatively connected with or disconnected from said first clutch means when the latter is in the reverse position.

4. In a machine tool having a part to be moved in opposite directions, power means, change speed gearing for moving said part at varying rates of movement, clutch means for connecting said power means to said change speed gearing and including a forward clutch member, a reversing clutch member and a movable clutch member, a secondary drive to said change speed gearing from said power means operatively connected with said reversing clutch member and including independent clutch means for rendering said secondary drive operative or inoperative, said secondary drive including means for imparting a relatively slow forward drive to said change speed gearing and said part.

5. In a machine tool having a part to be moved in opposite directions, change speed gearing for moving said part at different rates, power means, clutch means operatively interposed between said power means and said change speed gearing for starting, stopping and reversing the movement of the latter and including a reversing clutch member and a control member, a secondary drive from said power means to said part through said change speed gearing for imparting a relatively slow forward movement to said gearing and part and including means for selectively connecting or disconnecting said secondary drive with said reversing clutch member whereby when said control member is moved into the reversing position while said secondary drive is operatively connected with the reversible clutch member a slow forward drive will be imparted to said change speed gearing and said part.

6. In a machine tool having a part to be moved in opposite directions, change speed gearing for moving said part at different rates of movement, a secondary drive acting through said change speed gearing to move said part at a relatively slow rate in the forward direction, power means for driving said change speed gearing and said secondary drive, means for controlling the direction of movement of said part and said change speed gearing, and means for selectively rendering said secondary drive operative or inoperative when said last named means is in the reverse position.

7. In a machine tool having a part to be moved in opposite directions, change speed gearing for moving said part at different rates of movement, a secondary drive acting through said change speed gearing for moving said part in the forward direction at a relatively slow rate of movement, power means for actuating said change speed gearing and said secondary drive to move said part, and control means for selectively and directly connecting said power means with said change speed gearing to impart forward or reverse movements to said part or to indirectly connect said power means to said change speed gearing through said secondary drive to impart a relatively slow forward movement to said part.

8. In a machine tool having a part to be moved in opposite directions, change speed gearing for moving said part at different rates of movement, a secondary drive acting through said change speed gearing for imparting an additional and relatively slow movement to said part in both directions, power means for actuating said change speed gearing and said secondary drive to move said part, and control means for selectively and directly connecting said power means with said change speed gearing to impart forward or reverse movements to said part or to indirectly connect said power means to said change speed gearing through said secondary drive to impart relatively slow movements to said part in either direction.

9. In a machine tool having a part to be moved, power means, change speed gearing operatively interposed between said power means and said part for moving the latter at different normal rates of movement, a secondary drive adapted to be operatively connected with said power means and acting through said change speed gearing for imparting a relatively slow movement to said gearing and part, and clutch means for starting and stopping the movement of said part, said clutch means acting when moved from neutral toward operative position to first operatively connect said secondary drive with said change speed gearing and to then operatively connect said change speed gearing with said power means.

10. In a machine tool having a part to be moved, power means, change speed gearing for moving said part at different normal rates of movement and operatively interposed between the power means and said part, a secondary drive acting through said change speed gearing for imparting a relatively slow movement to said part, and clutch means for starting and stopping the movement of said part and including a control member, said clutch means acting when said control member is moved from the neutral position toward the forward position to first operatively connect said power means with said change speed gearing through said secondary drive and then to operatively connect said power means directly with said change speed gearing.

11. In a machine tool having a movable part, power means, a change speed drive for moving said part at different normal rates of movement and including slidable members, clutch means for connecting and disconnecting said change speed drive with said power means, and means automatically effective when said clutch means is positioned intermediate its operative and inoperative positions to impart a relatively slow positive drive to the change speed drive to enable the slidable members to be shifted without clashing.

12. In a machine tool having a movable part, power means, a change speed drive for moving said part and including slidable members, clutch means for operatively connecting said change speed drive with said power means and for starting, stopping and reversing the movement of the former, and means automatically effective when said clutch means is intermediate neutral and forward or reverse positions for imparting a relatively slow positive drive to said change speed drive in either direction whereby the slidable members of the change speed drive can be shifted without clashing.

13. In a machine tool having a movable part, power means, a change speed drive for moving said part at different normal rates of movement, clutch means operatively interposed between said power means and drive for starting and stopping the movement of the latter, means for imparting a relatively slow movement to said change speed drive whereby the slidable members thereof can be easily shifted, and a control member having an operative connection with said last named means and said clutch means such that said last means is automatically rendered effective when said member is moved from neutral to a position intermediate neutral and operative position or when it is moved from its operative position to a position intermediate the latter and neutral position.

14. In a machine tool having a movable part, power means, a change speed drive for moving said part at different normal rates of movement and in opposite directions, clutch means operatively interposed between said power means and drive for starting, stopping and reversing the movement of the latter, means for imparting a relatively slow movement to said change speed drive whereby the slidable members thereof can be easily shifted, and a control member having an operative connection with said last named means and said clutch means such that said last means is automatically rendered effective when said member is moved from either reverse or forward positions to a position intermediate said positions and neutral.

15. In a machine tool having a movable part, power means, a change speed drive for moving said part at different normal rates of movement, clutch means operatively interposed between said power means and drive for starting and stopping the movement of the latter, means for imparting a relatively slow movement to said change speed drive whereby the slidable members thereof can be shifted without clashing and including an automatic pick-up clutch having a constantly driven member, and a control member having an operative connection with said last named means and said clutch means such that said last named means is automatically rendered effective to impart a relatively slow movement to the drive when said member is moved from neutral to a position intermediate neutral and operative position or when it is moved from its operative position to a position intermediate the latter and neutral position.

16. In a machine tool having a movable part, power means, change speed gearing for moving said part at different normal rates of movement, shifting means for said change speed gearing, clutch means operatively interposed between said power means and gearing for starting and stopping the movement of the latter, means for imparting a relatively slow movement to said change speed gearing whereby the slidable members thereof can be shifted without clashing, and a control member having an operative connection with said shiftable means, said clutch means and said last named means such that when said member is moved from operative position to a position intermediate operative and neutral positions said last named means is automatically rendered effective to impart a relatively slow movement to said change speed gearing and said shifting means is actuated simultaneously therewith.

17. In a machine tool having a movable part, power means, change speed gearing for moving said part at different normal rates of movement, shiftable means for shifting said change speed gearing, means for imparting a relatively slow movement to said change speed gearing whereby during that portion of the shifting of the slidable members thereof that brings the same into driving intermeshing relationship the slidable members thereof can be shifted without clashing, and a control member having an operative connection with said last named means and said shiftable means such that when said member is moved in one plane said last named means is automatically rendered effective and said shiftable means is actuated simultaneously therewith.

18. In a machine tool having a movable part, power means, a change speed drive for moving said part at different rates of movement and including shiftable slidable members, and means for simultaneously shifting said slidable members and for imparting a relatively slow positive drive to said change speed drive during the shifting of the slidable members thereof and when said members are brought into driving relationship whereby the shifting is accomplished without clashing.

19. In a machine tool having a movable part, power means, a change speed drive for moving said part at different rates of movement, shiftable members for moving the slidable members of said drive to change the speed of said part, means for imparting a relatively slow positive drive to said change speed drive, and means for simultaneously rendering said last named means effective to impart a relatively slow drive to said change speed drive during the shifting of said shiftable members to actuate the slidable members of said drive and when said slidable members are brought into driving relationship.

20. In a machine tool having a movable part, power means, a change speed drive for moving said part at different rates of movement, shiftable means for moving the shiftable members of said drive to change the speed of said part, clutch means operatively interposed between said power means and drive for starting and stopping the movement of the latter, a secondary drive interposed between said power means and said change speed drive to impart to the latter relatively slow movement, and a control member having an operative connection with said shiftable means, said clutch means and said secondary drive such that when said member is moved from the operative position to a position intermediate said operative position and neutral position said secondary drive is automatically rendered effective and simultaneously therewith said shiftable means is actuated.

21. In a machine tool having a movable part, power means, a change speed drive for moving said part at different rates, means for preselecting during one operative step of the work cycle the rate of movement for said part for the next operative step and for effecting a change of said drive to the preselected speed, a secondary drive for imparting to said change speed drive a relatively slow positive driving movement to facilitate the engagement of the rate changing members of the latter, and a control member for simultaneously rendering said secondary drive effective and for actuating said preselecting means to effect a change in the change speed drive to the preselected speed.

22. In a machine tool having a movable part, power means, a change speed drive for moving said part at different rates, endwise movable spools for actuating the shiftable members of said change speed drive to change the rate of movement of said part, clutch means interposed between said power means and said change speed drive for starting and stopping the movement of the latter, a secondary drive interposed between said power means and said change speed drive for imparting to the latter a relatively slow positive driving movement, and a control member having an operative connection with said spools and clutch means such that when said control member is moved from its operative position to a position intermediate its operative position and the neutral position the clutch means is disengaged, the secondary drive is automatically rendered operative, and the spools are moved endwise to move the shiftable members of the change speed drive to change the rate of movement of said part.

23. In a machine tool having a movable part, power means, a change speed drive for moving said part at different rates in opposite directions, endwise movable spools for shifting the slidable members of said change speed drive to change the rate of movement of said part, clutch means interposed between said change speed drive and said power means for starting, stopping and reversing the movement of the part, a secondary drive interposed between said power means and said change speed drive for imparting a relatively slow positive driving movement to the latter in both directions, and a control member having an operative connection with said clutch means and said spools such that when said control member is moved from either its forward or reverse positions to a position intermediate said positions and neutral said clutch means is disengaged, said secondary drive is automatically rendered effective and said spools are moved endwise to shift the slidable members of the change speed drive to change the rate of movement of said part.

24. In a machine tool having a movable part, power means, a change speed drive for moving said part at different rates, endwise movable spools for shifting the slidable members of said drive to change the rate of movement of said part, clutch means interposed between said power means and said change speed drive for starting and stopping the latter, a secondary drive interposed between said power means and said change speed drive for imparting to the latter a relatively slow positive driving movement, and a control member having an operative connection with said clutch means and said shiftable spools such that when said control member is moved from neutral position to a position intermediate neutral and an operative position said spools are moved endwise and said secondary drive is rendered effective.

25. In a machine tool having a part to be moved at different rates, driving means for moving said part, rate changing means for said part, a housing for said rate changing means, a single manual control member located at a point remote with respect to said housing, and means forming an operative connection between said control member and said driving means and rate changing means such that movement of said control member in one plane controls said driving means and said rate changing means.

26. In a machine tool having a part to be moved at different rates, driving means for moving said part, rate changing means for said part, a housing for said rate changing means, a single manual control member located at a point remote with respect to said housing, and means forming an operative connection between said control member and said driving means and rate changing means such that movement of said control member in one plane controls both the driving means and the rate changing means and including a power actuated device operatively associated with said control member.

27. In a machine tool having a part to be moved at different rates, driving means for moving said part, rate changing means for said part, a housing for said rate changing means, a single manual control member located at a point remote with respect to said housing, and means for operatively connecting said control member with said driving means and said rate changing means such that movement of said control member in one plane controls both of said means and including a mechanical operative connection between one of said means and said control member, and a power actuated operative connection between the other of said means and said control member.

28. In a machine tool having a part to be moved at different rates, driving means for moving said part, rate changing means for said part, a housing for said rate changing means, a single manual control member located at a point remote with respect to said housing and having an operative connection with both of said means such that movement of said control member in one plane controls both of said means and including a hydraulically actuated device.

29. In a machine tool having a part to be moved at different rates, driving means for moving said part, rate changing means for said part, a housing for said rate changing means, a single manual control member located at a point remote with respect to said housing and having an operative connection with both of said means such that movement of said control member in one plane controls both of said means and including an electrically actuated device.

30. In a machine tool having a part to be moved at different rates, driving means for moving said part, rate changing means for said part, a single manual control member, and means forming an operative connection between said control member and both of said means such that movement of said control member in one plane controls said driving means and said rate changing means.

31. In a machine tool having a part to be moved at different rates, driving means for moving said part, rate changing means for said part including a device for preselecting the different rates of said part and for changing to the preselected rate, a housing for said rate changing means, a single control member located at a point remote with respect to said housing, and means forming an operative connection between said control member and said rate changing means and said driving means such that movement of said control member in one plane controls both of said means.

32. In a machine tool having a part to be moved at different rates, a change speed drive for moving said part, rate changing means associated with said drive, a housing for said change speed drive, power means, means operatively connecting said power means and said drive, a secondary drive interposed between said power means and said change speed drive for imparting a relatively slow positive driving movement to said change speed drive, a single control member, and means forming an operative connection between said control member, said rate changing means, clutch means and said secondary drive such that movement of said control member controls all of said elements.

33. In a machine tool having a movable part, power means, a change speed drive between said power means and said part for varying the rates of movement thereof, a secondary drive interposed between said power means and said change speed drive for imparting a relatively slow rate of movement to said part and said change speed drive to facilitate the shifting of the shiftable members thereof, a housing for said secondary drive, and a control member remotely located with respect to said housing and having an operative connection with said secondary drive.

34. In a machine tool having a movable part, a change speed drive for moving said part at different rates, power means, means for starting and stopping the movement of said change speed drive, a secondary drive interposed between said power means and said change speed drive for imparting a relatively slow movement to the latter to facilitate the shifting of the shiftable members thereof, a housing for said drives, and a control member located remotely with respect to said housing and having an operative connection with said secondary drive and said means for starting and stopping the movement of said change speed drive.

35. In a machine tool having a movable part, a speed changing drive for moving said part at different rates, means for changing the rate of movement of said part, power means adapted to be operatively connected with said speed changing drive, a secondary drive interposed between said power means and said speed changing drive for imparting a relatively slow movement to said drive to facilitate the shifting of the shiftable members thereof, a housing for said drives, and a single control member remotely located with respect to said housing and having an operative connection with said rate changing means and said secondary drive such that movement of said member in one plane controls both of said elements and including a power actuated device for actuating one of said elements.

36. In a machine tool having a rotatable spindle, change speed gearing for varying the speeds of said spindle and including shiftable gear cones, power means, clutch means interposed between said power means and said change speed gearing for starting and stopping the latter, shifting means for shifting the shiftable gear cones of said change speed gearing, a secondary drive interposed between said power means and said change speed gearing for imparting to the latter a relatively slow movement to facilitate the shifting of the shiftable gear cones, a housing for said change speed gearing and said secondary drive, a control member remotely located with respect to said housing, and means forming an operative connection between said control member, said shifting means, clutch means and secondary drive whereby said control member controls all of said elements.

37. In a machine tool having a head provided with a rotatable spindle, change speed gearing for changing the speed of said spindle, power means, clutch means interposed between said power means and said change speed gearing for starting and stopping the latter, a secondary drive interposed between said power means and said change speed gearing for imparting a relatively slow movement to the latter, a control member located remotely with respect to said head, and means forming an operative connection between said control member and said clutch means and secondary drive whereby said control member controls both of said elements.

38. In a machine tool having a head stock provided with a rotatable spindle, change speed gearing for changing the speed of said spindle and including shiftable speed changing members, means for shifting said members and including a device for preselecting the speed of said spindle during the operation of the machine and for subsequently actuating the shiftable members to obtain said preselected speed, power means, means for starting and stopping the change speed gearing, a secondary drive interposed between said power means and said change speed gearing for imparting to the latter relatively slow movement to facilitate the shifting of said shiftable members, a control member located remotely with respect to said head stock; and means forming an operative connection between said control member, said means controlling the starting and stopping of the change speed gearing, and said secondary drive whereby movement of said control member controls all of said elements.

39. In a machine tool having a movable part mounted in a housing, means for changing the rate of movement of said part, an indicating device on said housing and including means for indicating the rate of movement of said part in relation to the different sequential operative steps in a work cycle and in relation to cutting speeds in feet per minute and forming a production log, and a control member remotely arranged with respect to said housing, part and indicating device and having an operative connection with said indicating device for actuating the latter.

40. In a machine tool having a movable part, means for preselecting the rate of movement of said part during one operative step for the following operative step and including endwise movable members, a housing for said part and means, and a control member located remotely with respect to said housing and having an operative connection with said means and including means for indicating the rate of movement preselected for said part.

41. In a machine tool having a movable part, change speed gearing for moving said part, selecting means associated with said change speed gearing for selecting the rate of movement of said part and including endwise movable members, a housing for said part and change speed gearing and said means, a control member located remotely with respect to said housing and having an operative connection with said change speed gearing for controlling the same, and an indicating device located remotely with respect to said housing and having an operative connection with said selecting means.

42. In a machine tool having a movable part, means for varying the rate of movement of said part so as to produce different rates arranged in an arithmetical progression and including change speed gearing and a gradually accelerated and decelerated drive, and a common means for controlling said change speed gearing and said drive.

43. In a machine tool having a movable part, means for producing a continuous series of different rates of movement for said part arranged in an arithmetical progression and including change speed gearing and a gradually accelerated and decelerated drive, and a common means for controlling said change speed gearing or said drive or both said change speed gearing and said drive.

44. In a machine tool having a movable part, change speed means for imparting a plurality of different rates of movement to said part, a gradually accelerated and decelerated drive for said change speed means for superimposing upon the rates of movement imparted by the latter to said part additional rates of movement arranged in an arithmetical progression with the rates of movement imparted by the change speed means, and a common means for controlling said change speed means and said drive.

45. In a machine tool having a movable part, change speed means for imparting a plurality of different rates of movement to said part, a gradually accelerated and decelerated drive for said change speed means for superimposing upon the rates of movement imparted by the latter to said part additional rates of movement arranged in an arithmetical progression with the rates of movement imparted by the change speed means, and a common means operably associated with said change speed means and said drive for selecting the rate of movement for said part and for controlling said means and said drive.

46. In a machine tool having a movable part, change speed means for imparting a plurality of different rates of movement to said part, a gradually accelerated and decelerated drive for said change speed means for superimposing upon the rates of movement imparted by the latter to said part additional rates of movement arranged in an arithmetical progression with the rates of movement imparted by the change speed means, and means operatively connected with said change speed means and said drive and including rotatable and endwise movable members for preselecting during the operation of the machine a different rate of movement for said part and for then controlling said change speed means and drive to obtain the preselected rate of movement.

47. In a machine tool having a movable part, change speed gearing for imparting a plurality of different rates of movement to said part, a gradually accelerated and decelerated drive for said change speed gearing for superimposing upon the rates of movement imparted by the latter to said part additional rates of movement arranged in an arithmetical progression with the rates of movement imparted by the change speed gearing, and means having an operative connection with said gearing and drive for preselecting during the operation of the machine a different rate of movement for said part and for controlling said gearing and drive to obtain the preselected rate of movement.

48. In a machine tool having a movable part, means for imparting to said part a continuous series of different rates of movement arranged in an arithmetical progression and including change speed means and a gradually accelerated and decelerated drive, means for selecting the rate of movement of said part and for controlling said change speed means and drive and including a dial carrying indicia representing the various rates of movement of said part.

49. In a machine tool having a movable part, change speed means for moving said part at a plurality of different rates, a gradually accelerated and decelerated drive for said means for imparting to said part through said means a plurality of additional rates, and independent means for preselecting during one operative step of the work cycle the rates of movement to be imparted to said part in the next operative step by said change speed means and drive.

50. In a machine tool having a movable part, change speed means for moving said part at a plurality of different rates, a gradually accelerated and decelerated drive for said means for imparting to said part through said means a plurality of additional rates, and independent means for selectively varying the rate imparted by said means or the rate imparted by said drive or the rates imparted by both said means and said drive.

51. In a machine tool having a movable part, change speed means for moving said part at a plurality of different rates, a gradually accelerated and decelerated drive for said means for imparting to said part through said means a plurality of additional rates, and independent means for preselecting during one operative step the rate to be imparted to said part by said means or the rate to be imparted to said part by said drive or the combined rates to be imparted to said part by said means and drive for the next operative step in the work cycle.

52. In a machine tool having a movable part, change speed means for moving said part at a plurality of different rates arranged in a geometrical progression, a gradually accelerated and decelerated drive for said means for imparting to said part through said means a plurality of rates arranged in an arithmetical progression and interposed between the rates arranged in the geometrical progression and forming therewith a continuous series of rates from minimum to maximum in an arithmetical progression, and independent means for controlling said means and drive.

53. In a machine tool having a movable part, change speed gearing for moving said part at a plurality of different rates, a gradually accelerated and decelerated drive for said gearing for imparting to said part through said gearing a plurality of different rates, and independent means for controlling said gearing and drive and including relatively movable members provided with means indicating the rate of movement of said part.

54. In a machine tool having a movable part, change speed gearing for moving said part at a plurality of different rates, a gradually accelerated and decelerated drive for said gearing for imparting to said part through said gearing a plurality of different rates, and independent means for controlling said gearing and drive and including concentrically arranged rotatable members.

55. In a machine tool having a movable part, a change speed drive for moving said part at a plurality of different rates, a secondary drive for varying the rates imparted to said part by said change speed drive to provide additional rates of movement for said part, and independent means for controlling said change speed drive and said secondary drive.

56. In a machine tool having a movable part, a change speed drive for moving said part at a plurality of different rates, a secondary drive for superimposing upon the rates imparted to said part by said change speed drive additional rates of movement, and independent means for controlling said change speed drive and said secondary speed drive and including rotatable members one of which carries indicia and another of which is provided with means cooperating with said indicia to indicate the rate of movement of the movable part.

57. In a machine tool having a movable part, a change speed drive for moving said part at a plurality of different rates arranged in a geometrical progression, a secondary and gradually accelerated and decelerated drive for moving said part at a plurality of different rates arranged in an arithmetical progression to be interposed between the rates of the geometrical progression, and independent means for controlling said change speed drive and said secondary drive and including relatively movable members one of which is provided with indicia representing the rates in the geometrical progression and with indicia arranged intermediate the first indicia and representing the rates in the arithmetical progression and another of said members being provided with means cooperating with said indicia to indicate the rate of movement for said part.

58. In a machine tool having a movable part, a change speed drive for moving said part at a plurality of different rates, a secondary and gradually accelerated and decelerated drive for moving said part at additional different rates, and independent control members operatively connected with said drives and provided with cooperating indicating means for indicating the rates of movement imparted to said part.

59. In a machine tool having a movable part, a change speed drive for moving said part at a plurality of different rates, a secondary and gradually accelerated and decelerated drive for moving said part at a plurality of additional different rates, independent means for controlling said drives to vary the rate of movement of said part and including indexible and endwise movable members, and independent members operatively associated with said indexible and endwise movable members for indexing the same.

60. In a machine tool having a movable part, a change speed drive for moving said part at a plurality of different rates, a secondary and gradually accelerated and decelerated drive for imparting to said part additional different rates of movement, independent means operatively associated with said drives for preselecting during one operative step the rates of movement to be imparted to said part by said drives in the next operative step and including indexible members, and independent control members for said indexible members provided with cooperating indicating means indicating the rate of movement preselected for said part.

61. In a machine tool having a rotatable spindle, power means for rotating said spindle, change speed means directly connected with said power means and said spindle for varying the speed of said spindle, means for preselecting during one operative step in a work cycle the speed of said spindle for the following operative step, and auxiliary means operatively associated with the power means and said change speed means for varying the speeds normally imparted to said spindle by said power means through the change speed means.

62. In a machine tool having a spindle movable in opposite directions and a substantially constant speed power source, change speed gearing for varying the rate of movement of said spindle in both directions, means for directly connecting said change speed gearing with said power source, and a secondary means for imparting an additional rate of movement to said spindle through said change speed gearing in both directions.

MAX E. LANGE.
JOHN J. N. VAN HAMERSVELD.